US011256459B2

(12) United States Patent
Ito

(10) Patent No.: US 11,256,459 B2
(45) Date of Patent: Feb. 22, 2022

(54) DATA PROCESSING APPARATUS THAT SWITCHES TO EXECUTION OF A DIFFERENT COMMAND LIST AT A PRESET CONTROL POINT, METHOD OF CONTROLLING THE SAME, AND COMPUTER-READABLE STORAGE MEDIUM

(71) Applicant: CANON KABUSHIKI KAISHA, Tokyo (JP)

(72) Inventor: Tadayuki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/715,050

(22) Filed: Dec. 16, 2019

(65) Prior Publication Data
US 2020/0201635 A1 Jun. 25, 2020

(30) Foreign Application Priority Data
Dec. 20, 2018 (JP) .............................. JP2018-238647

(51) Int. Cl.
  *G06F 3/12* (2006.01)
  *H04N 1/00* (2006.01)
  *G06F 9/30* (2018.01)

(52) U.S. Cl.
CPC .......... *G06F 3/1275* (2013.01); *G06F 3/1212* (2013.01); *G06F 3/1244* (2013.01); *G06F 3/1285* (2013.01); *G06F 3/1296* (2013.01); *H04N 1/00915* (2013.01); *H04N 1/00931* (2013.01); *H04N 1/00933* (2013.01); *H04N 1/00949* (2013.01); *H04N 1/00954* (2013.01); *G06F 3/1215* (2013.01); *G06F 9/30054* (2013.01); *H04N 2201/0094* (2013.01)

(58) Field of Classification Search
None
See application file for complete search history.

(56) References Cited

U.S. PATENT DOCUMENTS

| 8,452,944 B2 | 5/2013 | Ito |
| 8,477,383 B2 | 7/2013 | Ito |
| 8,812,783 B2 | 8/2014 | Ito |

(Continued)

FOREIGN PATENT DOCUMENTS

JP  2010282429 A  12/2010

*Primary Examiner* — Miya J Williams
*Assistant Examiner* — Miya J Cato
(74) *Attorney, Agent, or Firm* — Venable LLP

(57) ABSTRACT

This invention provides a data processing apparatus operable to execute processing requested by an application, where the apparatus comprises a processing unit configured to, if there is an instruction for processing, execute the processing in accordance with a command list indicated by the instruction; and a control unit configured to, upon receiving a request for processing from the application, generate a command list corresponding to the request and instruct the processing unit to perform the processing, wherein the processing unit comprises a switching unit configured to, upon receiving, from the control unit, a second instruction during execution of a command list for a first instruction, switch to execution of a command list for the second instruction at a timing of execution of a command that is a control point preset in the command list for the first instruction.

20 Claims, 18 Drawing Sheets

(56) References Cited

U.S. PATENT DOCUMENTS

| | | |
|---|---|---|
| 8,819,360 B2 | 8/2014 | Ito |
| 2012/0036288 A1* | 2/2012 | Mattson .................. G06F 13/28 |
| | | 710/22 |
| 2016/0352952 A1* | 12/2016 | Ito ....................... H04N 1/00965 |
| 2018/0373562 A1* | 12/2018 | Roberts ................. G06F 9/4818 |
| 2019/0057484 A1* | 2/2019 | Iwamoto ................... G06T 1/20 |
| 2020/0175741 A1* | 6/2020 | Gierach ................ G06T 15/005 |

* cited by examiner

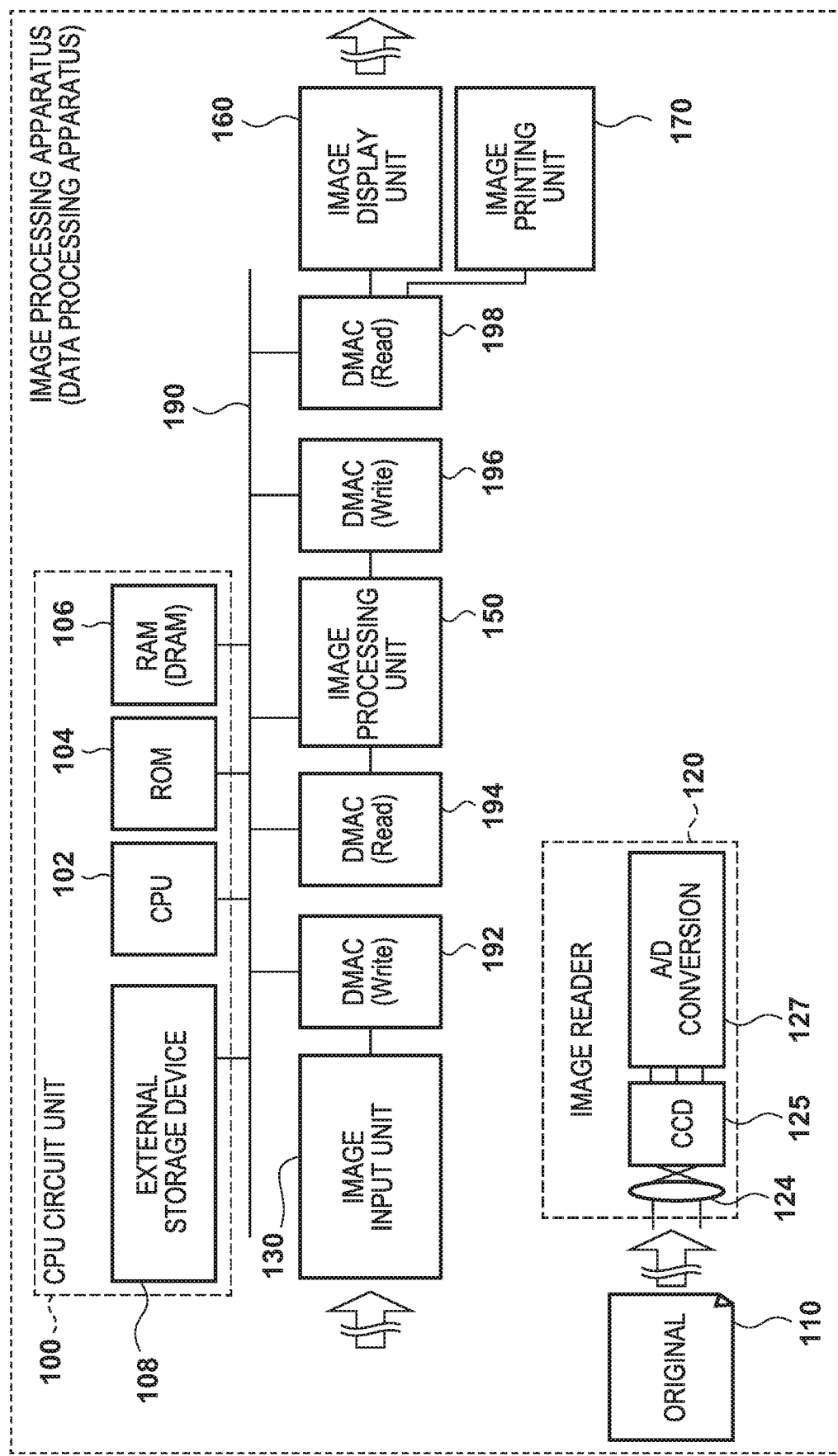

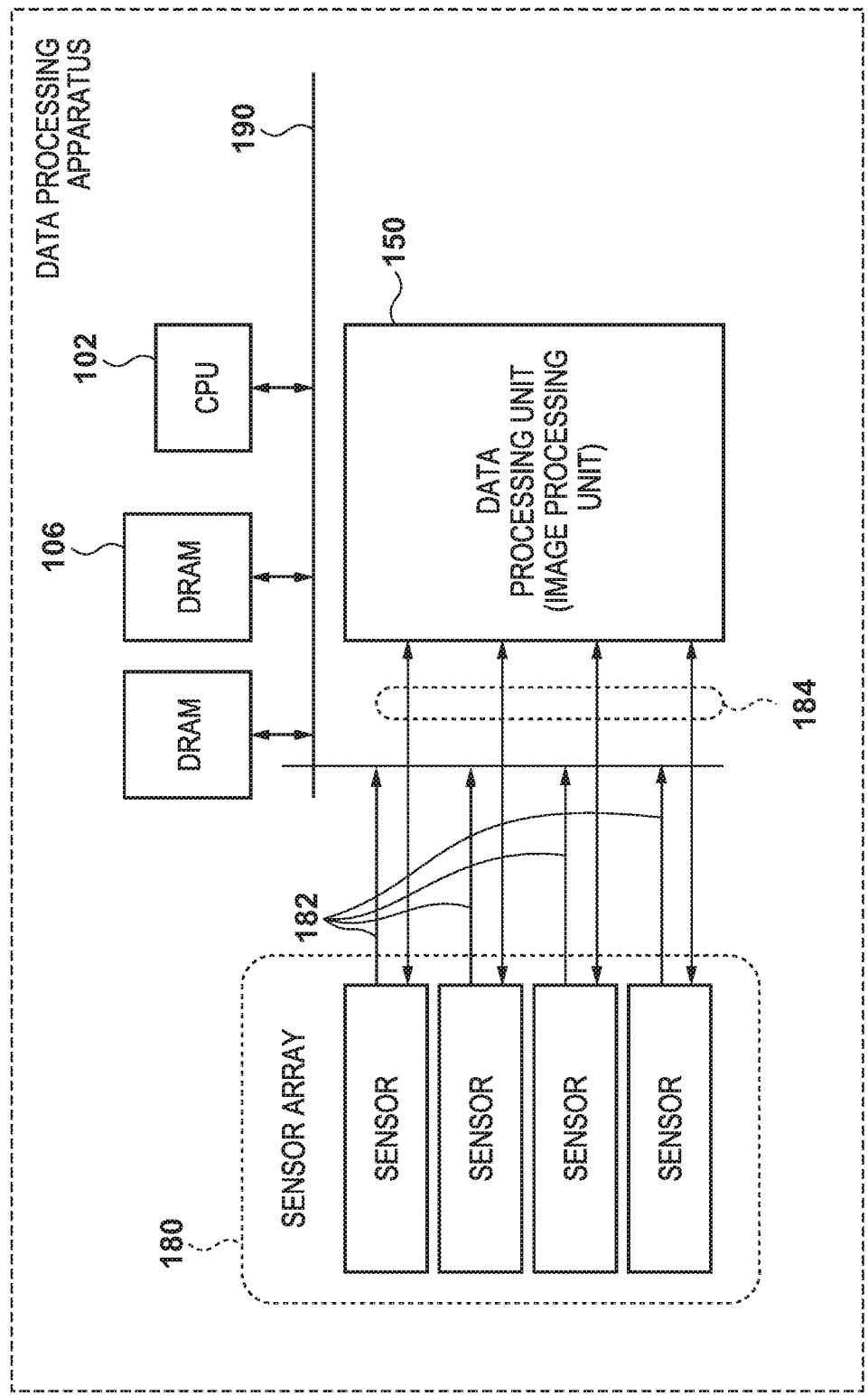

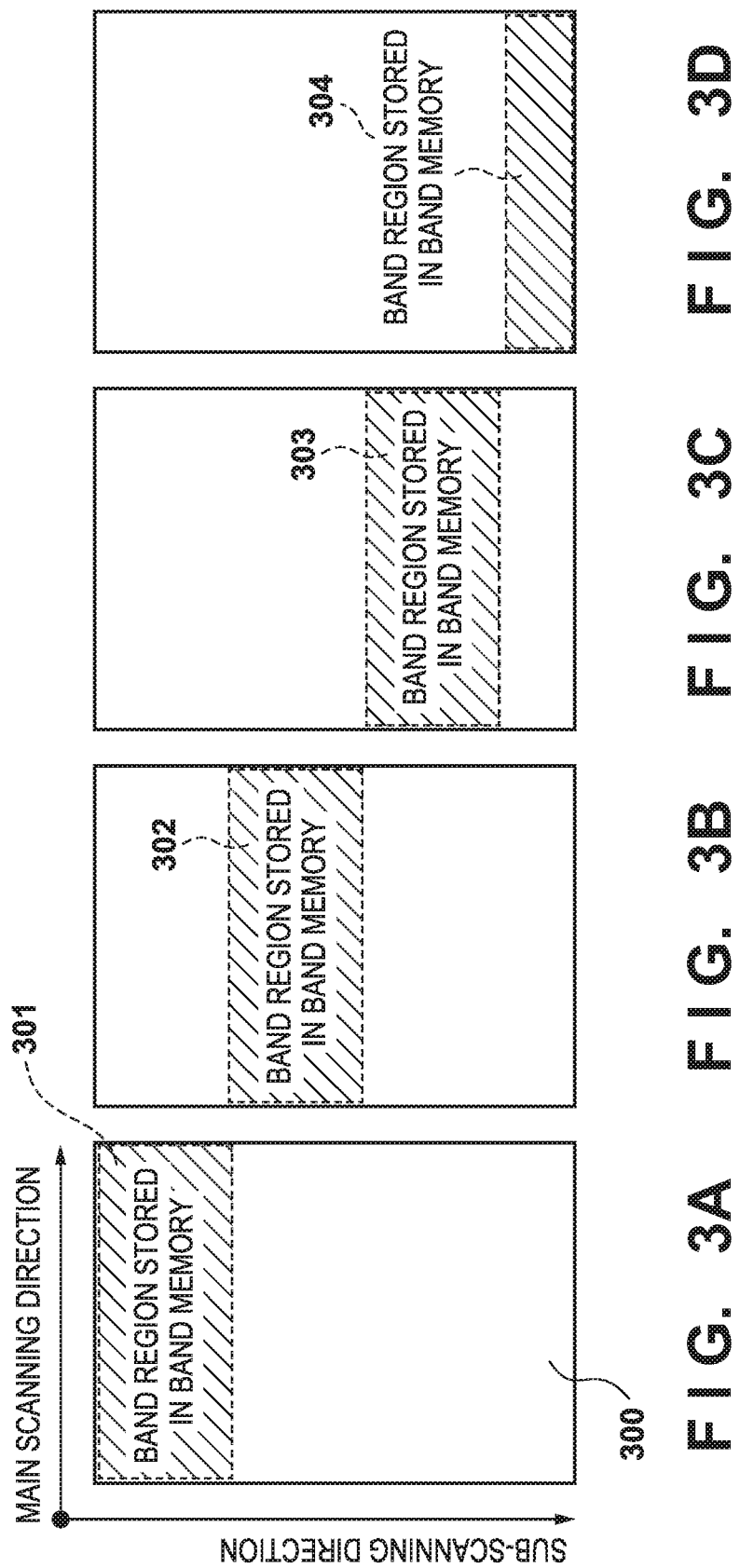

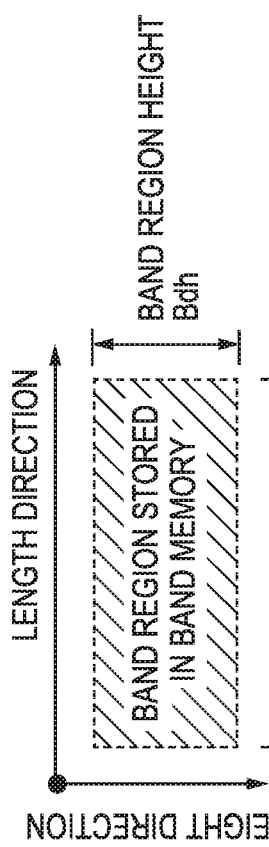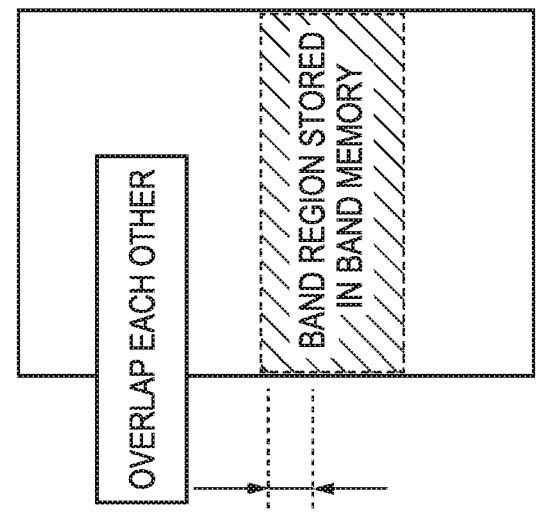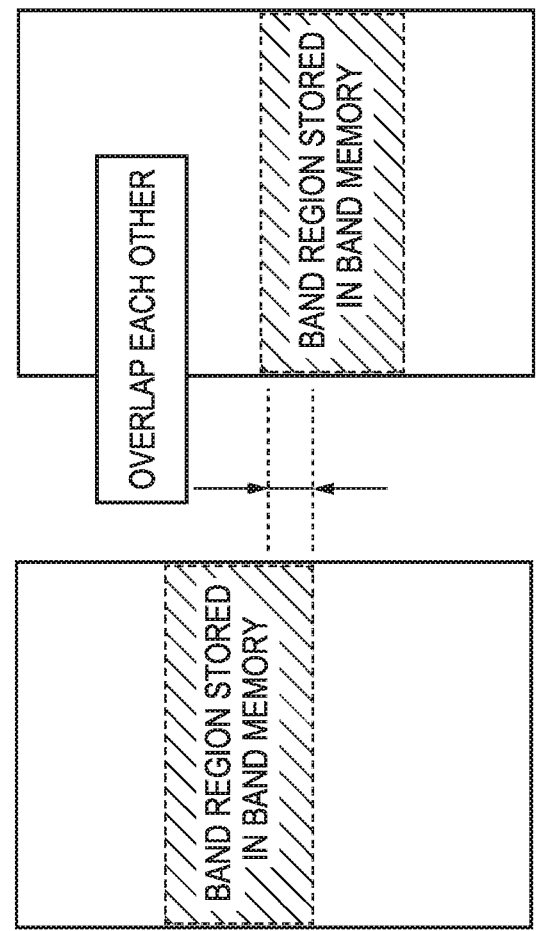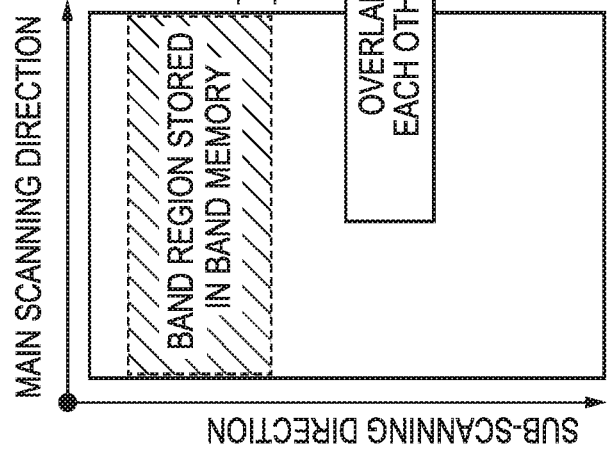

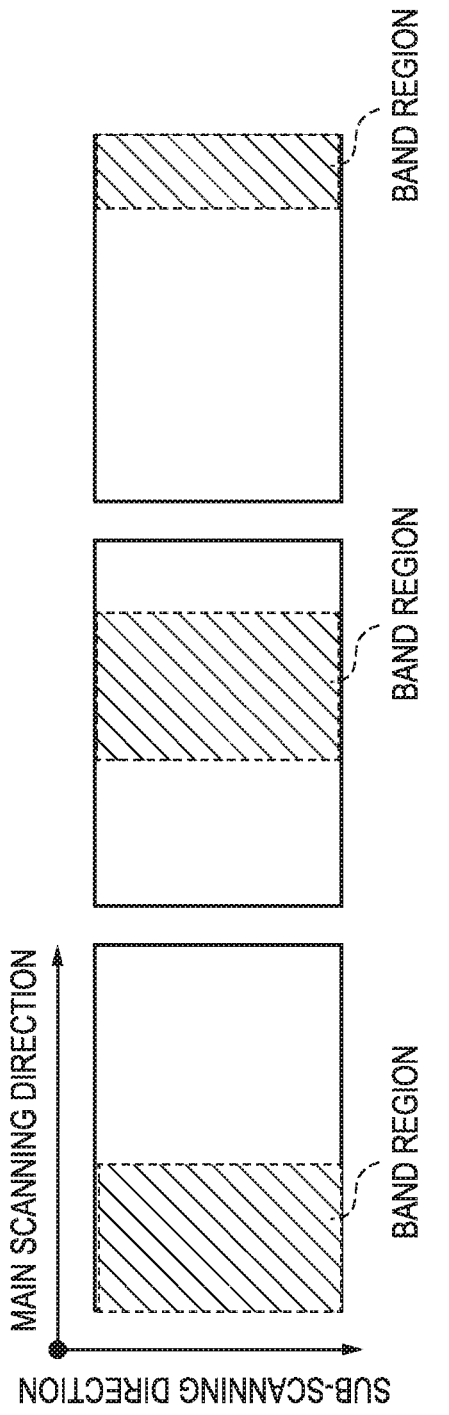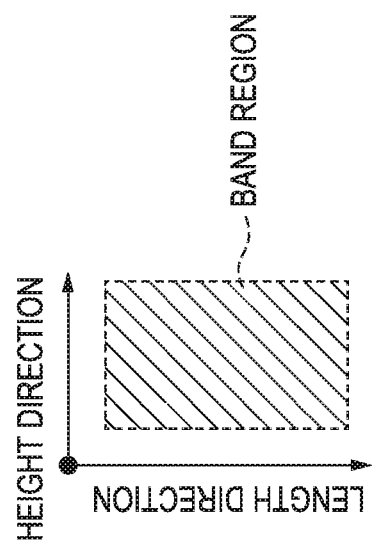

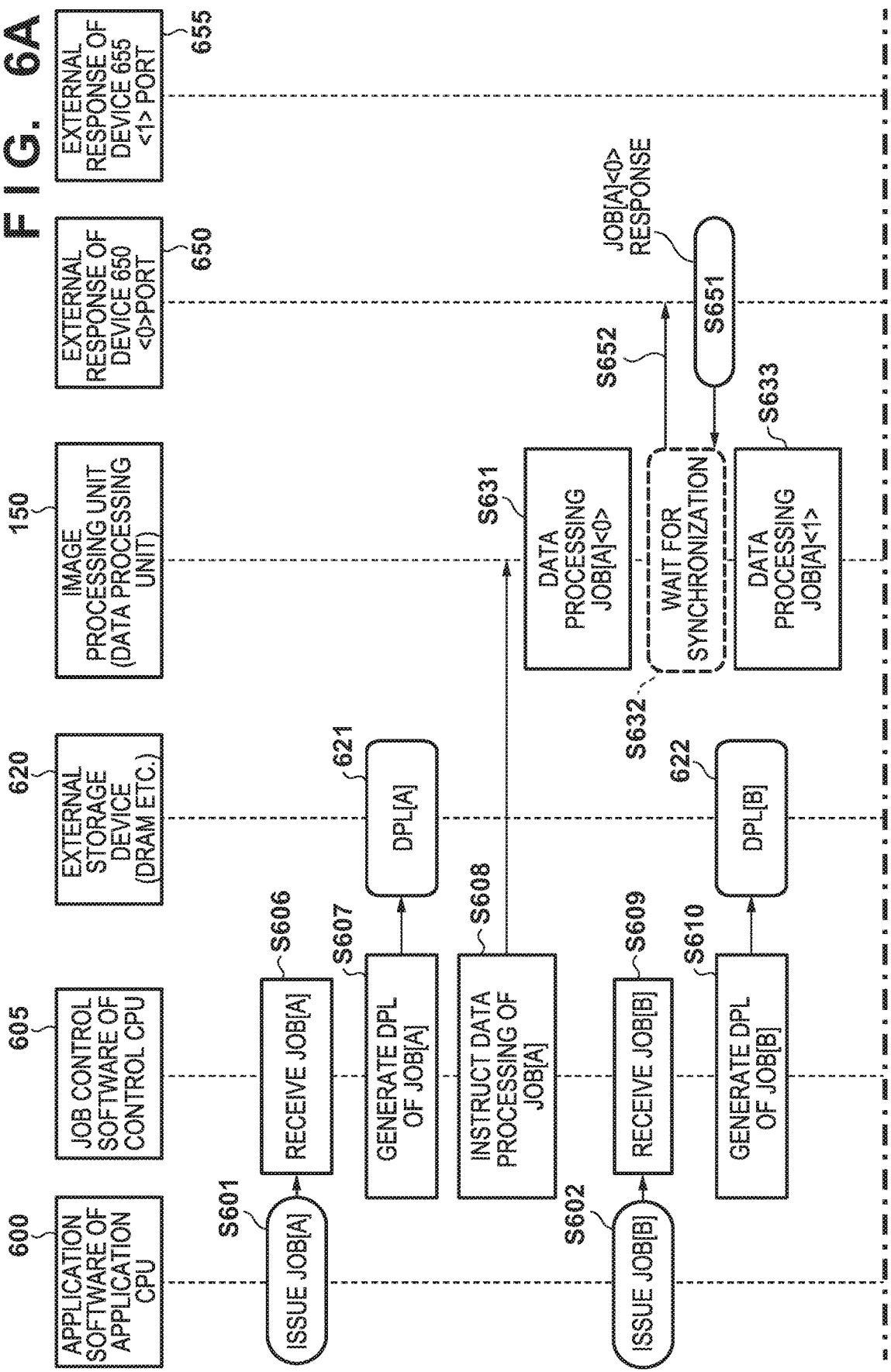

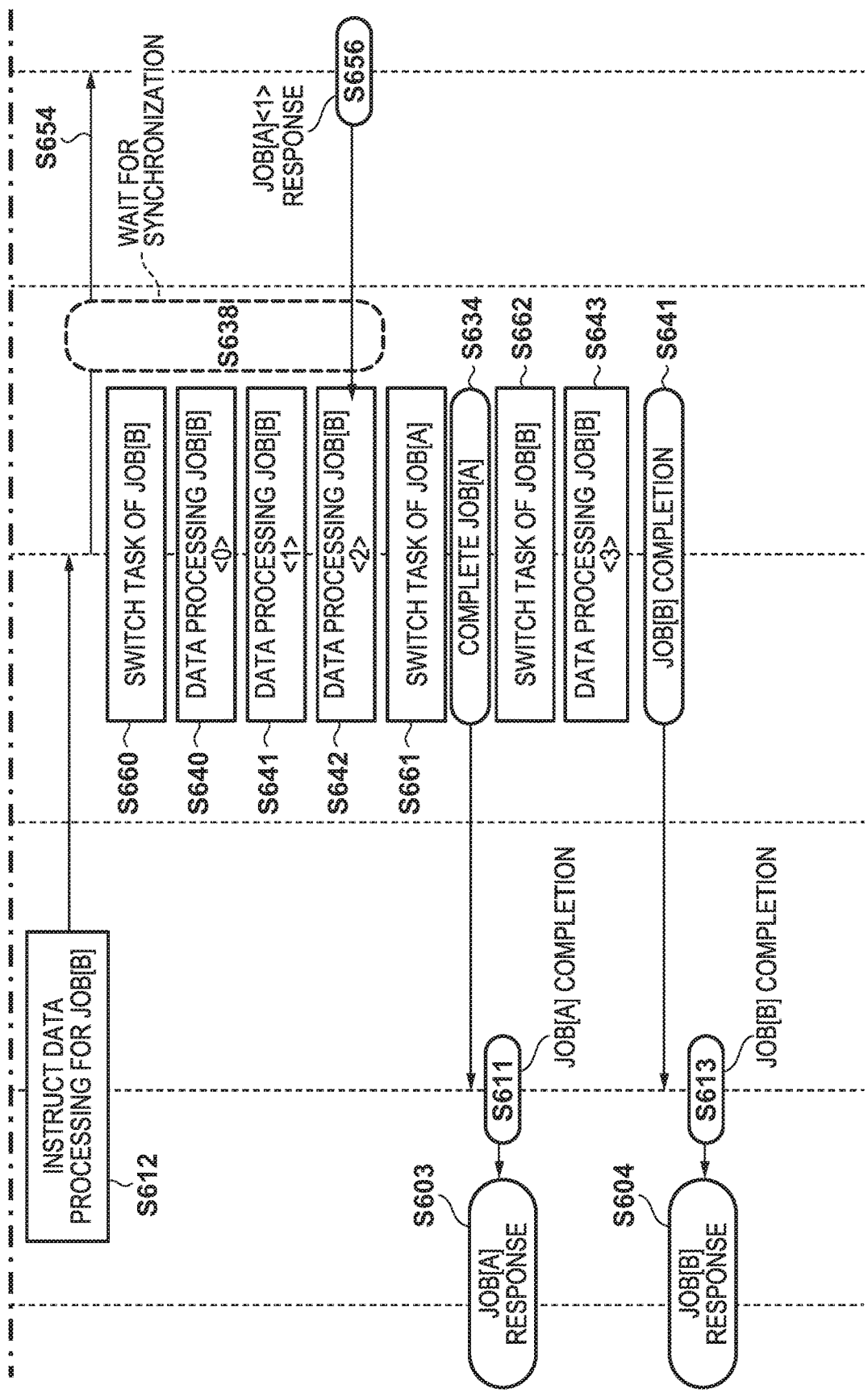

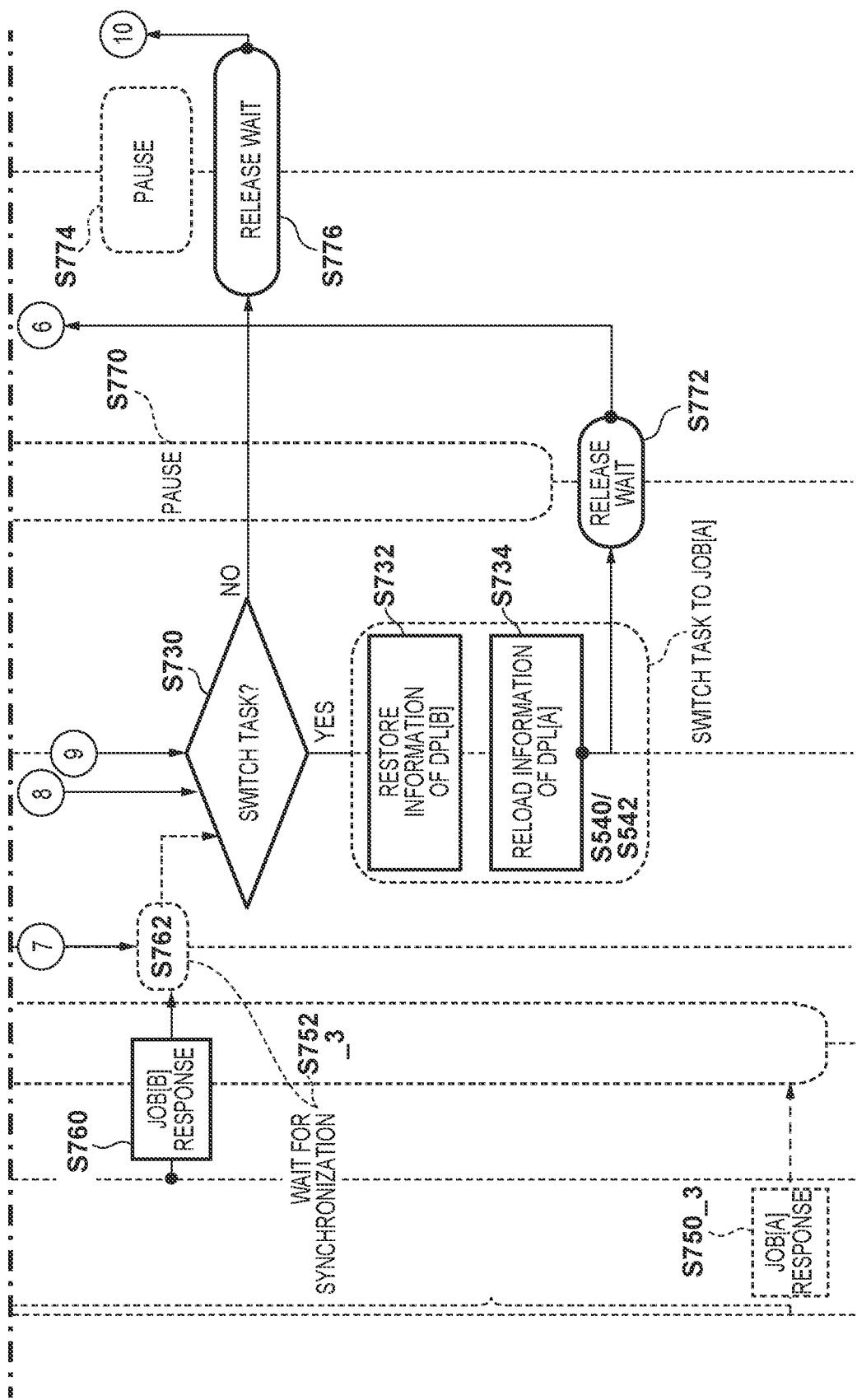

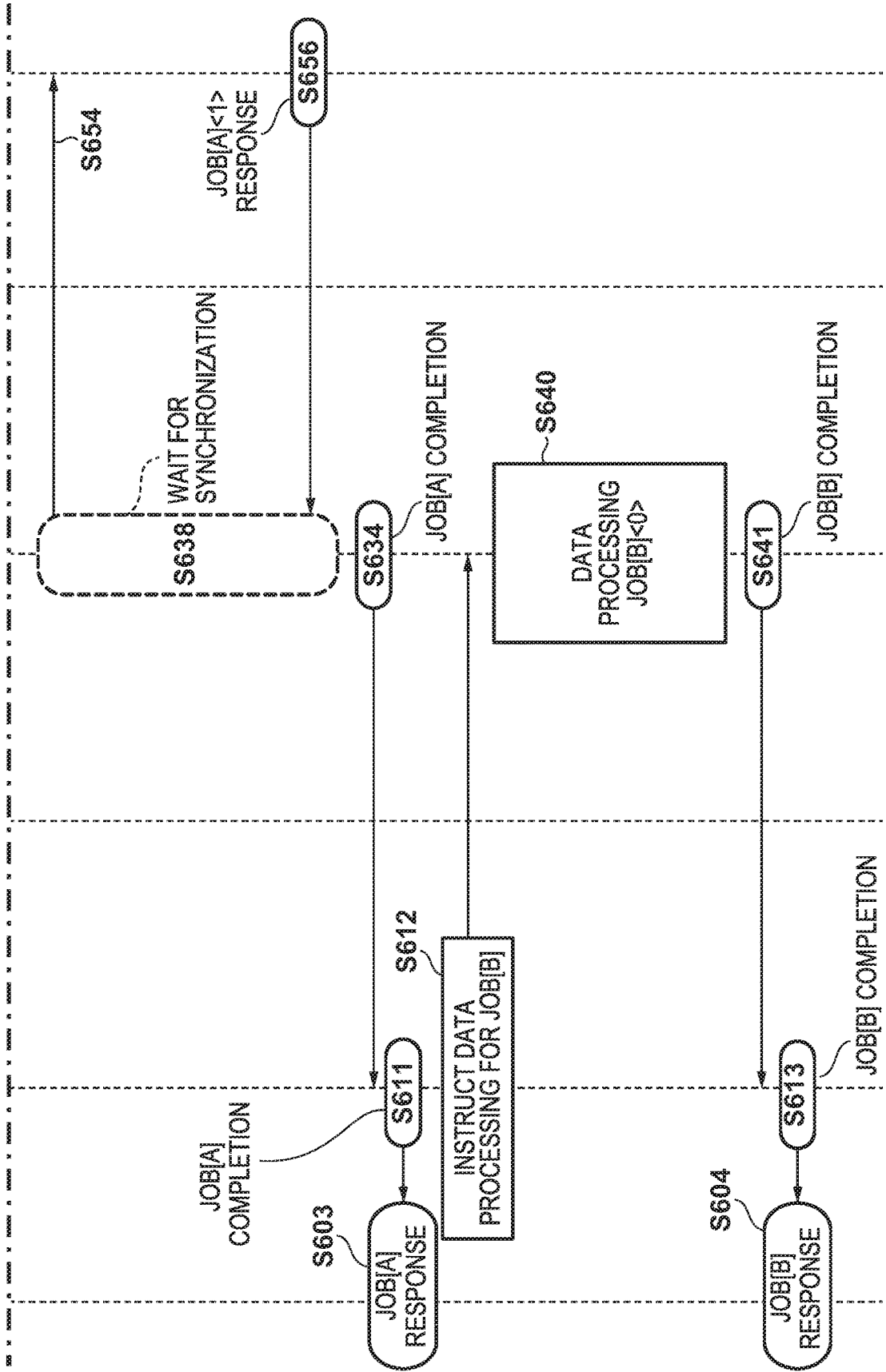

DATA PROCESSING APPARATUS THAT SWITCHES TO EXECUTION OF A DIFFERENT COMMAND LIST AT A PRESET CONTROL POINT, METHOD OF CONTROLLING THE SAME, AND COMPUTER-READABLE STORAGE MEDIUM

BACKGROUND OF THE INVENTION

Field of the Invention

The present invention relates to a data processing apparatus, a method of controlling the same, and a non-transitory computer-readable storage medium.

Description of the Related Art

In recent years, there has been a demand for both improvement in processing performance and further reduction in cost in various apparatuses. These devices are equipped with a certain type of computer system, and the processing performance per manufacturing cost of the computer system can be said to be one factor that determines the quality of the device.

For example, in a business copying machine, there are processing requests from a plurality of users on a network, and a responsiveness that is pleasant for the users is required. Meanwhile, in order to reduce the cost of the apparatus, it is necessary to share hardware resources of a wide variety of image processing and reduce the circuit scale, and achieving both of these requirements is a problem. For example, in image processing of a copying machine, scanner image processing and general-purpose image processing share hardware resources, and two processes may be executed on the same hardware resource.

For example, when a user A is performing scanner/copy processing, the hardware of scanner image processing operates in synchronization with a scanner unit (an external device). When the processing performance of the hardware of the scanner image processing is higher than that of the scanner unit, the hardware of the scanner image processing stops and waits until external synchronization from the scanner unit is input. On the other hand, when a user B makes a processing request for general-purpose image processing and uses the hardware of the scanner image processing, there is contention in hardware resources between the processing request of the user A and the processing request of the user B. As a result, the user B waits until the scanner/copy processing of the user A is complete. At this time, the user B is made to wait due the scanner/copy processing of the user A, especially due to the external synchronization with the scanner unit, which is not related to the content of the image processing for which the processing request was made by the user B.

Further, in recent years, there are broadening applications in which data processing must be performed while maintaining real-time performance with respect to input of a large number of mixed sensors and the like that are of various different types and are IoT devices. However, in order to arrange a large number of IoT devices around a person with low cost and low power consumption, it is necessary to actively share hardware resources and suppress manufacturing cost.

Reference: Japanese Patent Laid-Open No. 2010-282429 discloses a processing method in which a CPU control load is reduced in accordance with image processing/data processing that uses a command list (display list). However, this reference does not disclose measures with respect to requests for processing from a plurality of request destinations at the same time with respect to a shared hardware resource as in the above-mentioned processing example. This reference also does not disclose an improvement in real-time performance when a hardware resource is in contention among a plurality of processing requests.

SUMMARY OF THE INVENTION

The present invention has been made in view of the above problems, and provides a technique for improving processing performance and real-time performance when a plurality of processing requests conflict with respect a shared resource.

According to an aspect of the present invention, there is provided a data processing apparatus operable to execute processing requested by an application, the apparatus comprising: a processing unit configured to, if there is an instruction for processing, execute the processing in accordance with a command list indicated by the instruction; and a control unit configured to, upon receiving a request for processing from the application, generate a command list corresponding to the request and instruct the processing unit to perform the processing, wherein the processing unit comprises a switching unit configured to, upon receiving, from the control unit, a second instruction during execution of a command list for a first instruction, switch to execution of a command list for the second instruction at a timing of execution of a command that is a control point preset in the command list for the first instruction.

According to the present invention, it is possible to reduce the manufacturing cost of an apparatus by sharing various types of image processing resources. In addition, by sharing hardware resources, it is possible to improve the throughput of the entire apparatus by executing other data processing in waiting time for external synchronization. In addition, it is possible to provide a data processing apparatus, a data processing method, and a program that have improved real-time performance with respect to processing requests from various users, various types of sensors, and the like.

Further features of the present invention will become apparent from the following description of exemplary embodiments (with reference to the attached drawings).

BRIEF DESCRIPTION OF THE DRAWINGS

FIG. 1A is a block diagram illustrating an overall configuration example of an image processing apparatus.

FIG. 1B is a diagram illustrating a use case of a sensor configuration.

FIGS. 3A to 3L are diagrams illustrating an exemplary operation of band processing.

FIGS. 6A and 6B are diagrams for explaining an example of a task switching operation.

FIGS. 7A-7C are diagrams for explaining an example of a processing flow of a task switching mechanism.

FIGS. 10A and 10B are diagrams for explaining an example of basic operation with no task switching.

DESCRIPTION OF THE EMBODIMENTS

Figure 2:
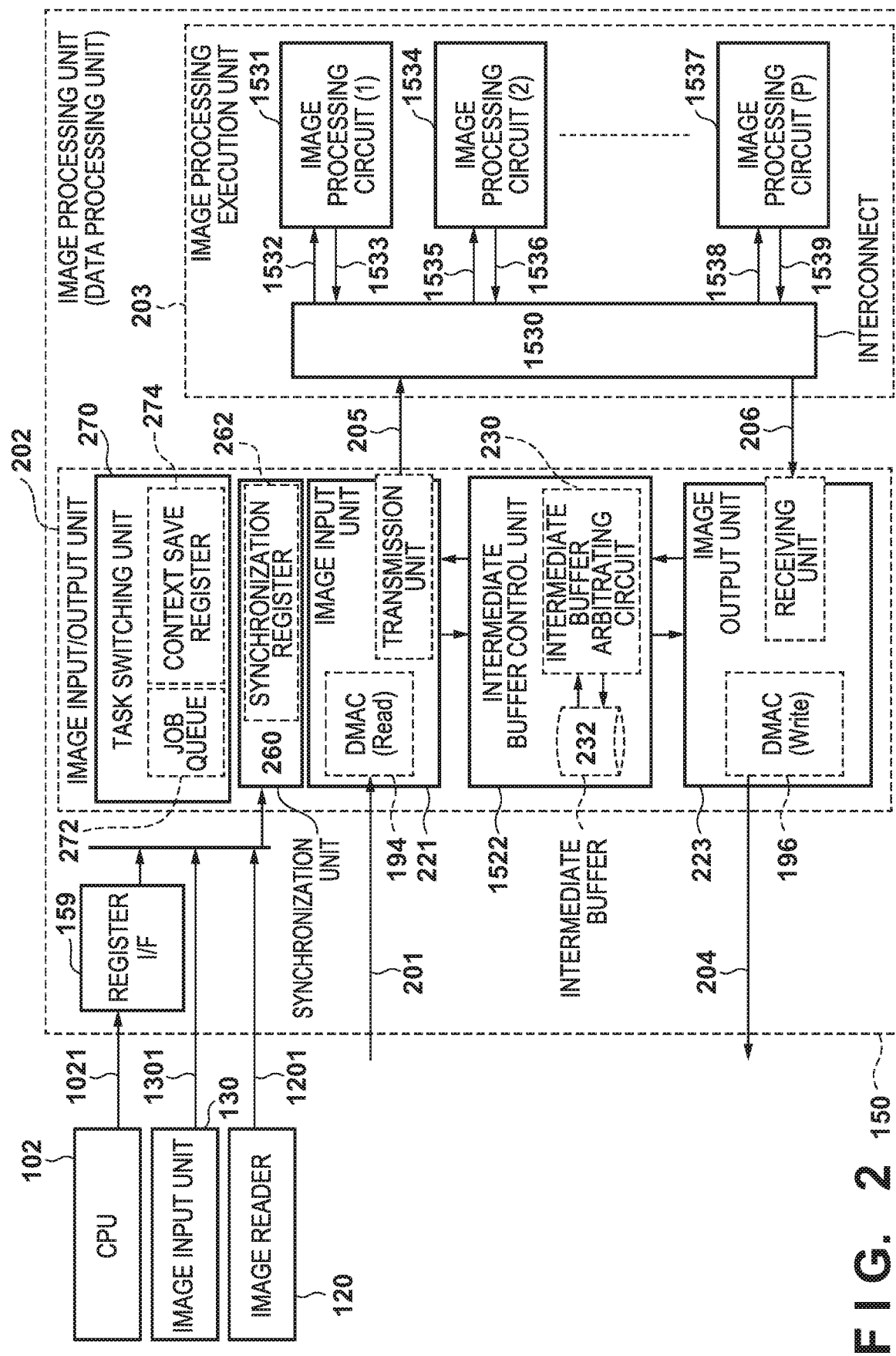
FIG. 2 is a block diagram illustrating an example of a configuration of an image processing unit.

Hereinafter, embodiments of the present invention will be described in detail with reference to the appended drawings. It should be noted that the configuration described in the following embodiments is merely an example, and the present invention is not limited to the illustrated configuration.

First Embodiment

Apparatus Configuration

FIG. 1A is a block diagram illustrating an overall configuration example of an image processing apparatus (computer) according to the present embodiment. As illustrated in the figure, the image processing apparatus of the present embodiment includes a CPU circuit unit 100, an image reader 120, an image input unit 130, an image processing unit 150, an image display unit 160, an image printing unit 170, and the like. Hereinafter, an outline of operation in accordance with these configurations will be described.

The image reader 120 includes a lens 124, a CCD sensor 126, an analog-to-digital converter 127, and the like. That is, image information of an original 110 is formed on the CCD sensor 126 via the lens 124, and the image information is converted into analog electric signals of R (Red), G (Green), and B (Blue) by the CCD sensor 126. The image information converted into the analog electric signals is input to an analog signal processing unit (not illustrated), and after correction or the like is performed for each of the R, G, and B colors, the image information is converted into digital data by the analog-to-digital converter 127, and a digitized full-color digital image signal (pixel values) is generated. The generated digital image signal is input to the image input unit 130, and then the digital image signal is input to the DMAC (Direct Memory Access Controller) 192.

The operation of the DMAC 192 is set in advance by the CPU 102, and the inputted digital image signal is stored in a RAM 106 of the CPU circuit unit 100 or the external storage device 108 via the shared bus 190. Note that data obtained by collecting digital image signals for a plurality of pixels so as to form one image is hereinafter referred to as image data. In the present embodiment, it is assumed that digital image signals are stored in the RAM 106 or the like in the form of image data. When performing image processing, the CPU 102 or the image input/output unit 202 which is described later activates a DMAC 194 to cause image data stored in the RAM 106 or the like to be read out, and cause digital image signals corresponding to pixels to be processed to be inputted to the image processing unit 150.

The image processing unit 150 is, for example, an image data processing apparatus that generates image data by performing correction of individual differences between reading elements of a sensor device such as a scanner, color correction such as input gamma correction, and the like on an inputted digital image signal. The DMAC 196 stores the image data, for which image processing has been performed, in the RAM 106 or the external storage device 108. Note that the DMAC 196 is controlled as follows. For example, the CPU 102 or an image input/output unit 202 described later sets the operation of the DMAC 196 in advance, or the CPU 102 activates the DMAC 196. Note that, for operation of the DMAC 196, for example, there is a setting to write processed image data to the RAM 106. As described above, the image processing unit 150 performs image processing for printing an image, such as input color correction processing, spatial filter processing, color space conversion, density correction processing, and halftone processing, on an inputted digital image signal. After printable image data is generated, this image data is caused to be stored in the RAM 106 or the like by the DMAC 196.

The DMAC 198 reads out image data that has been subjected to image processing and is stored in the RAM 106, and outputs this image data to the image printing unit 170. The image printing unit 170 is, for example, a printer. The setting of the DMAC 198 is performed by, for example, the CPU 102. The image printing unit 170 includes a print output unit (not illustrated) that uses an inkjet head, a thermal head, or the like, and prints an image on print paper based on a digital image signal of inputted image data.

Although an example in which the image data of the original 110 read by the image reader 120 is printed out by the image printing unit 170 is described here, the present embodiment is not limited to this example. For example, by using the image input unit 130, the image display unit 160, or the like, desired image processing may be performed on an inputted image, and the processed image may be displayed on an image display apparatus (not illustrated) such as a display.

The CPU circuit unit 100 includes a CPU 102 for arithmetic control, a ROM 104 for storing fixed data and a program, a RAM 106 used for temporarily storing data and loading a program, an external storage device 108, and the like. The CPU circuit unit 100 controls the image reader 120, the image processing unit 150, the image printing unit 170, and the like, and comprehensively controls the sequence of the image processing apparatus of the present embodiment. The external storage device 108 is a nonvolatile storage medium such as a disk for storing parameters, programs, and correction data used by the image processing apparatus of the present embodiment. There may be a configuration in which data, programs, and the like of the RAM 106 are loaded from the external storage device 108. In the present embodiment, data transfer with the image processing unit 150 is performed via the DMACs 194 and 196, but a storage destination of transferred data is not limited to the RAM 106 and may be the external storage device 108. The RAM 106, storage destinations of transferred data allocated in the external storage device 108, and the like are hereinafter collectively referred to as a global buffer (an external storage buffer). In the following explanation, a global buffer is allocated on a DRAM, which is an example of the RAM 106, and image data is stored in the global buffer.

Image Processing Unit

Next, the detailed configuration and operation of the image processing unit 150 that performs image processing on image data will be described with reference to FIG. 2. In FIG. 2, to facilitate understanding, assume that the image input unit 150 of the image processing unit 150 includes the DMAC 194 for reading out image data from the global buffer. The DMAC 196 for writing is illustrated as being included in an image output unit 223 of the image processing unit 150.

First, the CPU 102 or the image input unit 221 activates the DMAC 194. As a result, the DMAC 194 reads out image data from the global buffer. Then, the DMAC 194 supplies the image data that was read out to the image input/output unit 202 of the image processing unit 150 via an input port 201. When the image input unit 221 in the image input/output unit 202 acquires the inputted image data, the image input unit 221 stores the acquired image data in a temporary storage unit (an intermediate buffer 232) that is included in an intermediate buffer control unit 222. The image input unit 221 generates a pixel value while reading out the image data temporarily stored in the intermediate buffer, and supplies the pixel value as an input pixel value 205 to an image processing execution unit 203. Note that, in contrast to the above-described global buffer, "local buffer" can be a generic term for the temporary storage unit (the intermediate buffer 232) that is included in the intermediate buffer control unit 222.

The image processing execution unit 203 executes predetermined image processing on the input pixel value 205, and outputs an output pixel value 206 obtained as a result thereof to the image input/output unit 202. Note that details of the processing in the image processing execution unit 203 will be described later. The input pixel value 205 and the output pixel value 206 may be one or more pixel values, and a plurality of pixel values may be input as the input pixel value 205 to which one pixel value is output as the output pixel value 206.

The image output unit 223 in the image input/output unit 202 generates output image data from the processed output pixel value 206, and stores the output image data in a storage unit (the intermediate buffer 232) that is in the intermediate buffer control unit 222. The image output unit 223 reads out the processed image data that was temporarily stored in the intermediate buffer 232, and outputs the processed image data from the output port 204 via the DMAC 196 as output image data. The DMAC 196 has already been activated by the CPU 102 as described above, and the received output image data is written to the RAM 106.

In this manner, in the image processing unit 150, the image input/output unit 202 acquires image data via the DMAC 194, and the image processing execution unit 203 executes data processing on the image data. Then, the image input/output unit 202 outputs the image data after data processing via the DMAC 196. That is, the image processing unit 150 is responsible for a role of performing data processing on image data included in the image processing apparatus, and returning the processed image data to the image processing apparatus. The image input/output unit 202 has a role as a data input/output control device for adjusting the input/output of data. The image input/output unit 202 has a role as a control device for controlling execution of data processing by transmitting and receiving data to and from the image processing execution unit 203.

Next, the image processing execution unit 203 of the image processing unit 150 will be described in detail. The image processing execution unit 203 is configured by an interconnect 1530 and P image processing circuits: an image processing circuit (1) 1531 to an image processing circuit (P) 1537. The P image processing circuits and interconnect 1530 are connected to each other via ports such as input ports 1532, 1535, . . . , 1538 and output ports 1533, 1536, . . . , 1539. Each of the image processing circuits performs one type of image processing. Though the type of image processing is not limited, for example, input color correction processing, color space conversion, density correction processing, halftone processing, spatial filter processing, resolution conversion, trimming processing, edge extension processing, IP conversion, chroma upsampling, and the like are used. Each image processing circuit may be realized by hardware such as a pipeline circuit, or may be realized by a processor, a program (software), or the like.

The interconnect 1530 receives the input pixel value 205 from the input port, performs processing on the input pixel value 205, and then outputs the processed output pixel value 206 from the corresponding output port. The interconnect 1530 is realized by a connection means such as a crossbar or a ring bus, and can arbitrarily switch connection destinations for input ports and output ports. Therefore, by the CPU 102 setting the designations of the connection destinations of these ports, the interconnect 1530 can change an execution order of the P image processing circuits or bypass some of the processing, for example. In this manner, the image processing execution unit 203 realizes desired image processing by selecting and combining various types of processing according to an application.

Band Processing

Hereinafter, as a region division method for image data in the present embodiment, band processing for performing processing for each band region obtained by one-dimensionally dividing image data will be described.

Hereinafter, band processing according to the present embodiment will be described by referring to FIGS. 3A to 3I. In band processing, as illustrated in FIGS. 3A to 3D, one piece of image data 300 is divided into band-shaped band regions 301 to 304, and image processing is sequentially performed for each of the band regions 301 to 304. Note that, since the band region is obtained by dividing image data in either a main scanning direction or a sub-scanning direction, the band regions and the image data coincide in length in either the main scanning (or horizontal) direction or the sub-scanning (or vertical) direction. In the example of FIG. 3A, the image data is divided with respect to the sub-scanning direction. Therefore, the original image data and the band region have the same length in the main scanning direction and different lengths in the sub-scanning direction. Hereinafter, a divided elongated region is referred to as a band region, a storage region into which the band region is loaded is referred to as a band memory, and the act of dividing image data is referred to as band division. The band memory may be allocated in an appropriate storage region on the system, but for simplicity of explanation, the band memory is allocated as a storage region (global buffer) in the RAM 106.

In the following, as illustrated in FIG. 3E, a coordinate system (main scanning direction-sub-scanning direction) of the image data is defined in accordance with a coordinate system (band region coordinate system) for a length direction and a height direction, and the band region is represented by length×height. The length of a band region, that is, the size of one side in the length direction of the band region, is a value of either the length in the main scanning direction or the length in the sub-scanning direction of the image data. The height of the band region, that is, the size of one side in the height direction of the band region, is an arbitrary value. In the example of FIG. 3A, the length direction is the main scanning direction, and the height direction is the sub-scanning direction. On the other hand, when the image data is divided in the main scanning direction as illustrated in FIGS. 3I to 3K, the length direction is the sub-scanning direction and the height direction is the main scanning direction as illustrated in FIG. 3L. The band division as illustrated in FIG. 3I may be performed, for example, when the size of the image data in the main scanning direction is larger than the size of the image data in the sub-scanning direction.

In the bands illustrated in FIGS. 3A to 3D, initially, the first band region 301 is loaded into the band memory in the RAM 106, and subjected to image processing. Next, the band memory in the RAM 106 to which the first band region 301 was loaded is overwritten and loaded with the second band region 302, and image processing is performed on the second band region 302. Subsequently, the band memory in the RAM 106 to which the second band region 302 was loaded is also overwritten and loaded with the third band region 303, and image processing is performed on the third band region 303. Finally, the band memory in the RAM 106 to which the third band region 303 was loaded is also overwritten and loaded with the fourth band region 304, and image processing is performed on the fourth band region 304. As can be understood from FIGS. 3A to 3D, the lengths of the band regions 301 to 304 are the same, but the heights of the band regions 301 to 304 does not have to be the same. Therefore, the height of the band memory is determined in accordance with the band regions (band regions 301 to 303 excluding the band region 304 in FIGS. 3A to 3D) in which the size of one side in the height direction is the largest.

Note that, when local (close) image processing such as spatial filter processing or the like is performed without a gap between band regions, the band regions are set so that portions of the band regions overlap each other at boundaries between adjacent regions, as illustrated in FIGS. 3F to 3H.

As described above, in the present embodiment, image data is divided into regions, and image processing/data processing is executed in units of partial images.

Image Data Structure

Hereinafter, the structure of image data in the present embodiment will be described in detail. In the present embodiment, as described above, image data is temporarily stored in a storage region (global buffer) in the RAM 106. Generally, the RAM 106 which is a main memory is formed of an inexpensive DRAM in many cases. Therefore, when reading and writing image data via the DMAC as in the present embodiment, it is desirable that the image data be handled in units in which the DRAM can read and write without lowering performance.

Command List and Command Data Structure

Hereinafter, with reference to FIG. 4, description is given in detail regarding of an example of a command list and a data configuration of a command in the present embodiment. In the present embodiment, as described above, the command list (display list) and the command are temporarily stored in the storage region (global buffer) in the RAM 106 which is the main memory.

In the present embodiment, there are at least six types of commands that configure a command list: register setting commands 410, register readout commands 430, an image processing command 420, a synchronization command 440, an end command 460, and a branch command 450. These commands function in the image processing unit 150 of FIG. 2. Hereinafter, the operation of each command will be described with reference to FIG. 2, which is a configuration example of the image processing unit 150.

First, each command configuring the command list (display list) is executed by various image processing circuits (the image input unit 221, the image processing circuit (1) 1531, the image processing circuit (2) 1534 to the image processing circuit (P) 1537, and the image output unit 223) of the image processing unit 150. Each command passes through a respective image processing circuit in an order that follows the connection order set for the interconnect 1530. For example, the commands pass through the image input unit 221, the image processing circuit (1) 1531, the image processing circuit (2) 1534 to the image processing circuit (P) 1537, and the image output unit 223 in this order. The internal information of each command may be rewritten by each image processing circuit, but a command will not be deleted halfway.

The register setting commands 410 are commands for writing a value into registers of various image processing circuits of the image processing unit 150. The register readout commands 430 are commands for reading out register values of various image processing circuits. The register values read out by the register readout command 430 are outputted (storage) to memory areas accessible by the CPU 102.

The image processing command 420 is a command for controlling operations of the image input unit 221 and the image output unit 223. The image input unit 221 receives the image processing command 420, activates the DMAC 194 according to the register values set in advance by the aforementioned register setting commands 410 to acquire digital image data and correction data from the main memory. Here, the register values preset in the DMAC are, for example, a readout start address and a number of readouts set by the register setting command. Next, via the interconnect 1530, the image input unit 221 sends the image processing command 420 to the image processing circuit (1) 1531, the image processing circuit (2) 1534 to the image processing circuit (P) 1537, and the image output unit 223. In this manner, by sending the image processing command 420 to a downstream side, for example, when the operation of the register setting and the data processing to be described later is switched by time division, the switching control can be easily realized. The image input unit 221 converts the digital image data and the correction data acquired using the DMAC 194 into the format of a data processing command (not illustrated). The image input unit 221 then sends the data processing command to the image processing circuit (1) 1531, the image processing circuit (2) 1534 to the image processing circuit (P) 1537, and the image output unit 223.

The image output unit 223 receives the image processing command 420, then extracts information from an RGB region of a subsequent data processing command, performs predetermined packing, and converts a result thereof into data in units of 32 bytes. Then, in accordance with the register values set in advance by the register setting command, the image output unit 223 activates the DMAC 196 to write the processed digital image data in units of 32 bytes to the RAM 106.

The data processing command is a command for executing image processing using the image processing circuit (1) 1531, and the image processing circuit (2) 1534 to the image processing circuit (P) 1537. Before executing image processing, in accordance with the aforementioned register setting command, predetermined register values are set in advance in the image processing circuit (1) 1531, the image processing circuit (2) 1534 to the image processing circuit (P) 1537. Each of the image processing circuit (1) 1531 and the image processing circuit (2) 1534 to the image processing circuit (P) 1537 through which the data processing command passes performs a series of image processing, thereby performing parallel processing in a pipeline manner. The end command 460 is a command indicating the end of the command list, and after receiving this command, the image output unit 223 outputs an end interrupt to the CPU 102.

In the image processing apparatus of the present embodiment, a branch command 450 is also provided so that a control point (synchronization point) can be set at an appropriate position in a data flow of image processing. For example, in the example command list (display list) of FIG. 4 described above, a branch command 450 has been inserted. In the image processing apparatus of the present embodiment, it is possible to change the processing destination to be executed next from the insertion position of the branch command 450 to a predetermined branch destination address "0x2000" (register setting command 414) by using a branch function (S452). In the synchronization register 262 of the synchronization unit 260 in the image input/output unit 202, a readout address (DPL address) of the command list which is a branch destination and a number of repetitions can be designated. For example, from the image processing data flow, the CPU 102 may directly set these in advance via the register I/F 159. A register setting command in a command list may also be used to rewrite the value of the synchronization register 262 prior to the branch command 450. In the example of FIG. 4, the DPL address is set to 0x2000 and the number of branches is set to one. Therefore, the image input/output unit 202 changes the processing destination only once (S452), and when the processing next reaches the branch command 450, the processing proceeds to the end command 460 without branching.

Synchronization Commands

In the data processing apparatus of the present embodiment, the synchronization command 440 is also provided so that a control point (synchronization point) can be set at an appropriate position in a data flow of image processing. This command may be inserted in any position in the command list described above that one wishes to control (synchronize with). For example, the synchronization command 440 in the example of the command list (display list) of FIG. 4 is decoded by the image input unit 221 in a similar manner to other commands, and then transmitted from the image input unit 221 to the image processing execution unit 203. When the image input unit 221 decodes the synchronization command 440 and determines that the command is the synchronization command 440, the image input unit 221 pauses readout and transmission of the command list. The image input unit 221 enters a paused (stalled) state, and notifies the synchronization unit 260 of FIG. 2 of the decoding of the synchronization command 440. The image input unit 221 waits in the paused (stalled) state, and the readout from the intermediate buffer 232 of the command positioned subsequent to the synchronization command 440 in the command list, and the transmission of the command to the image processing execution unit 203 are stopped.

The synchronization command 440 initializes a pipeline for image processing in the process of passing through the image processing circuit of the image processing execution unit 203. Note that, in the course of passing through the image processing circuit, specific processing other than initialization, for example, setting of a special value to a specific register, readout of a status value, or the like may be executed. Subsequently, the synchronization command 440 is received from the image processing execution unit 203 by the image output unit 223. By operation as above, the command being processed in the pipeline of the image processing execution unit 203 reaches the image output unit 223, and the series of image processing is complete. A state is then entered where is no command in the image processing execution unit 203, and image processing is not being executed. This operation is referred to as an internal synchronization function or a barrier synchronization function of the image processing execution unit 203 according to an embodiment of this invention. Since the image processing execution unit 203 is in an initialization state, this is a state where operation without problems is possible, even if the image processing task of the image processing unit 150 is subsequently switched, and the data flow control or the operation is changed. Then, the image output unit 223 receives and decodes the synchronization command 440, and when it is determined that the command is the synchronization command 440, the image output unit 223 notifies the synchronization unit 260 that the synchronization command has reached the image output unit 223. Similar to the image input unit 221 described above, the image output unit 223 also waits in a paused (stalled) state.

In the image input/output unit 202 of the image processing unit 150 of the present embodiment, since there is a configuration in which the input unit and the output unit are integrated, it is easy to realize the barrier synchronization function at high speed.

External Synchronization Function

The synchronization unit 260 receives external synchronization from a CPU, an image input unit (camera), an image readout unit (a scanner), an image display apparatus (a display), and a printing device (printer), which are synchronization destinations. For example, when the synchronization destination is the CPU 102, external synchronization is notified by a method of writing a predetermined value to the synchronization register 262 of the image processing unit 150 via the register I/F 159 of FIG. 2. For other synchronization destinations, external synchronization is notified by writing a predetermined value to the synchronization register 262 of the image processing unit 150 using an external synchronization signal 1301 or a synchronization signal 1201.

The synchronization unit 260 determines whether or not external synchronization has been notified in accordance with whether the synchronization register 262 has become the predetermined value. If there is no notification of external synchronization, external synchronization reception continues.

Decoding Processing (Command Processing)

Figure 5:
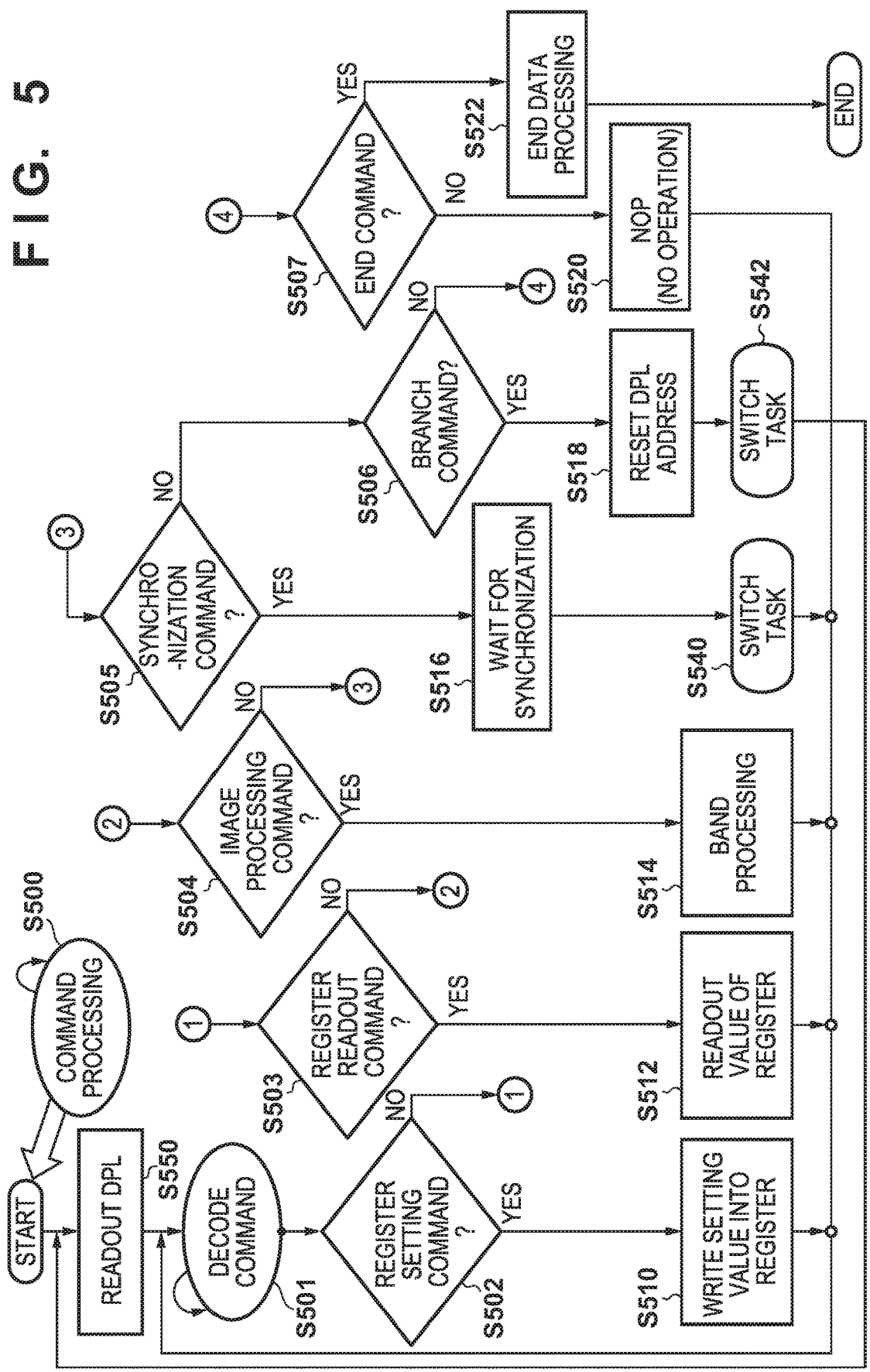
FIG. 5 is a diagram for explaining an example of a command decoding operation of a data processing apparatus.

Referring to FIG. 5, command processing (step S500) for decoding a command list that has been read out will be described in detail below. The image input/output unit 202 of the image processing unit 150 reads out (step S550) the command list (DPL), and executes decoding (step S501) of a command. First, the image input/output unit 202 determines whether or not the command is a register setting command (step S502), and if the command is a register setting command, the image input/output unit 202 writes a setting value to a predetermined register (step S510). First, the image input/output unit 202 determines whether or not the command is a register readout command (step S503), and if the command is a register readout command, the image input/output unit 202 reads out a value of a predetermined register (step S512). The image input/output unit 202 determines whether the command is an image processing command (step S504), and if the command is an image processing command, the band processing illustrated in FIG. 3 is executed. In addition, the image input/output unit 202 determines whether the command is a synchronization command (step S505), and if the command is a synchronization command, the image input/output unit 202 waits for external synchronization (step S516), and performs a task switching process (step S540) if needed. In addition, the image input/output unit 202 determines whether the command is a branch command (step S506), and if the command is a branch command, the image input/output unit 202 resets the DPL address (step S518), and performs a task switching process (step S542) if needed. The image input/output unit 202 determines whether the command is an end command (step S507), and if the command is an end command, the data processing ends (step S522). Note that, in the case of other commands, nothing is performed as a NOP (No Operation) command (step S520).

Plurality of Job Operations

The image processing apparatus according to the present embodiment simultaneously receives various processing requests, such as a button operation of a user interface (not illustrated) of the apparatus or an operation via a network from another external device such as a personal computer, and needs to execute data processing according to the requests.

Firstly, basic operation for a plurality of JOBs when a plurality of processing requests are received will be described with reference to FIGS. 10A and 10B. Note that, in this figure, the devices 650 and 655 are devices that are present outside the image processing unit 150, such as the image reader 120, the image input unit 130, the image printing unit 170, and the image display unit 160, and are devices that must be synchronized with when performing image processing regardless of the type thereof.

Figure 10A:
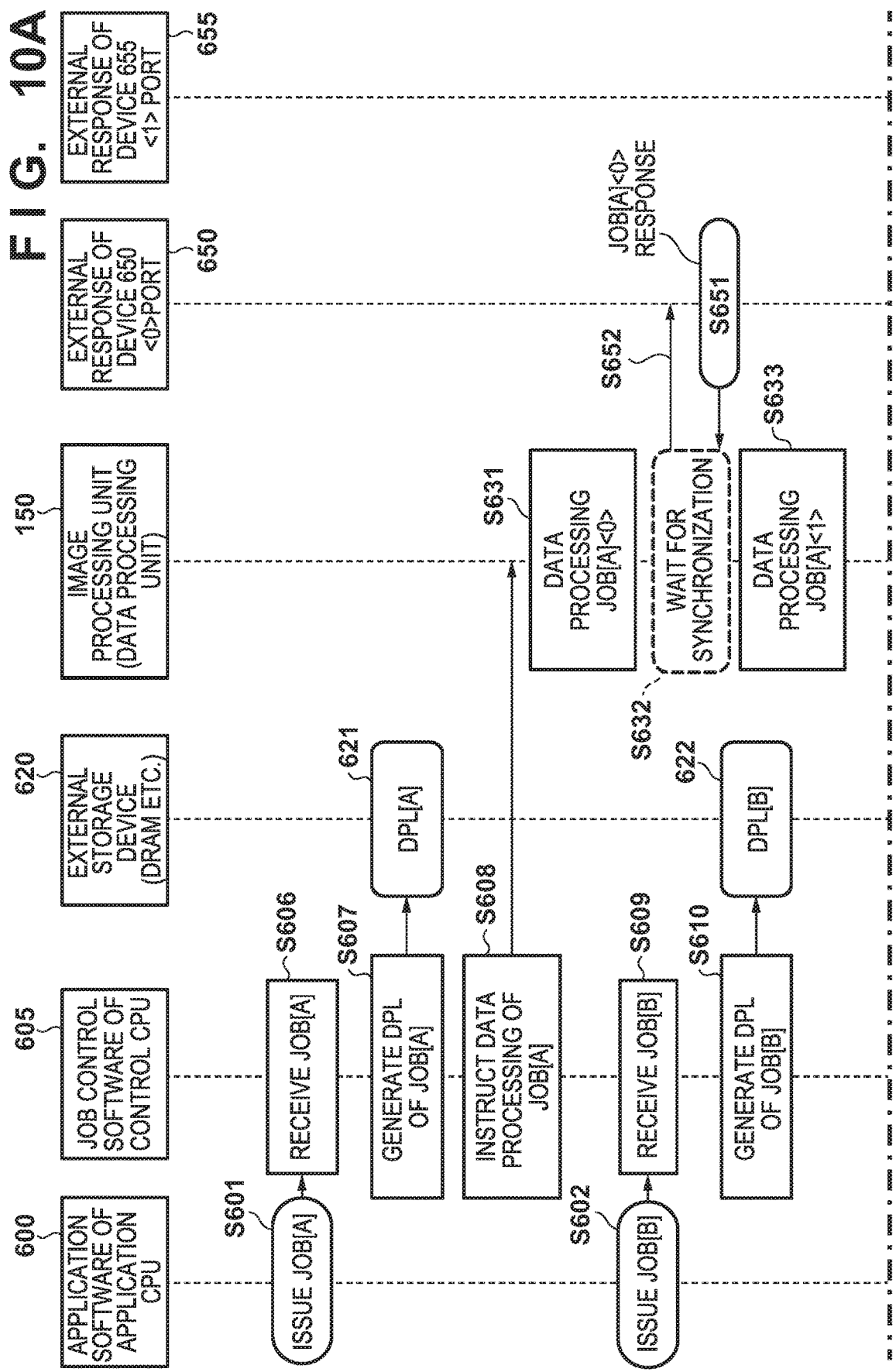

As illustrated in FIGS. 10A and 10B, application software 600 operating on an application CPU receives a processing request A, and issues JOB[A] to the JOB control software 605 operating on a control CPU (step S601). The JOB control software 605 receives the JOB[A] (step S606) and generates a command list (DPL) 621 for the JOB[A] (step S607). The generated command list (DPL) 621 is stored in a predetermined address of an external storage device such as a DRAM. Via the register I/F 159 of the image processing unit 150 which performs data processing, the JOB control software 605 instructs data processing for the JOB[A] which includes address information (step S608).

Meanwhile, the application software 600 receives a processing request B from another external device, and issues JOB[B] to the JOB control software 605 (step S602). The JOB control software 605 receives the JOB[B] (step S609) and generates a command list (DPL) 622 for the JOB[B] (step S610). The generated command list (DPL) 622 is stored in a predetermined address of an external storage device such as a DRAM. In the example of operation for a plurality of JOBs in FIGS. 10A and 10B, since a response indicating the completion of the data processing for JOB[A] instructed earlier has not been received, the JOB control software 605 does not immediately instruct the image processing unit 150 to perform the data processing for JOB[B].

The image processing unit 150 receives the data processing instruction (step S608), reads out the command list (DPL) 621 as described above, and executes the data processing while performing the command processing (steps S631 and S633). In one example of the plurality of JOB operations of FIGS. 10A and 10B, because this is a command list where the number of repetitions is set to 1 as described above, band processing is executed twice as with the data processing JOB[A]<0> (step S631) and the data processing JOB[A]<1> (step S633). As in the previously-described FIG. 4, the branch command 450 is preceded by a synchronization command 440, and the synchronization command 440 is used to receive external synchronization of another device and synchronize with the other device. In this example of operation, the image processing unit 150 notifies (step S652) the completion of the first data processing JOB[A]<0> (step S631). Then, the image processing unit 150 performs synchronization waiting (step S632) until the image processing unit 150 receives (step S651) a JOB[A]<0> response from the external synchronization <0> port of the device 650, and synchronizes with the device 650. In addition, the image processing unit 150 notifies (step S654) the completion of the second data processing JOB[A]<1> (step S633). Then, the image processing unit 150 performs synchronization waiting (step S638) until the image processing unit 150 receives (step S656) a JOB[A]<1> response from the external synchronization <1> port of the device 655, and synchronizes with the device 655.

Figure 4:
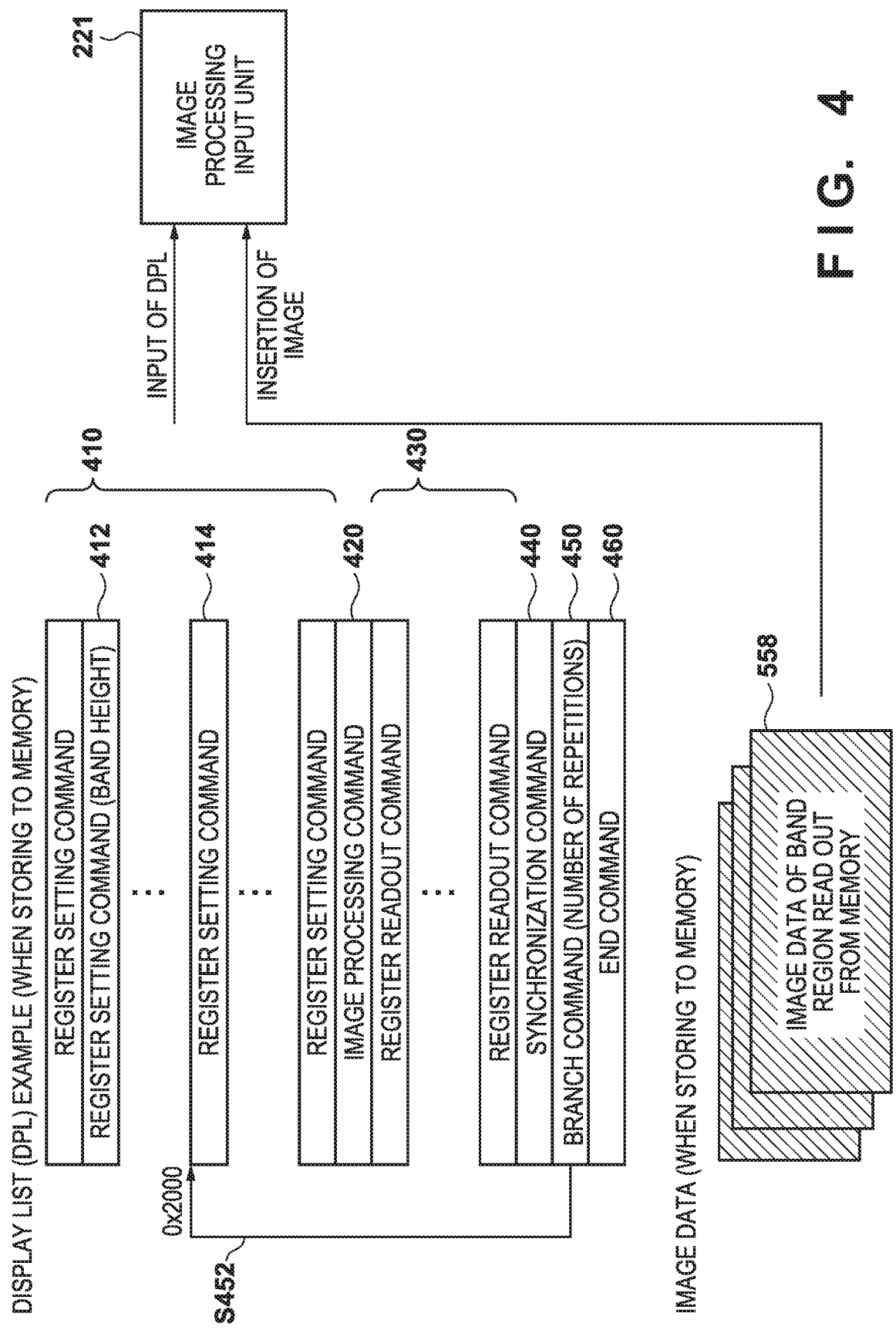
FIG. 4 is a diagram illustrating an example of storing a command list (display list) in a RAM.

The image processing unit 150 processes the end command 460 in FIG. 4 of the command list (DPL) 621, thereby completing all data processing, and notifies the JOB control software 605 of the completion of the processing of the JOB[A] (step S634). The JOB control software 605 receives (step S634) the process completion of JOB[A], and notifies the application software 600 of the completion of JOB[A] (step S611). Then, the application software 600 responds to the external device that made the processing request with the completion of JOB[A] (step S603).

Next, the JOB control software 605 instructs the image processing unit 150 to perform data processing on JOB[B] (step S612). The image processing unit 150 receives the data processing instruction (step S612), reads out the command list (DPL) 622 as described above, and executes the data processing while performing the command processing (step S640). When the image processing unit 150 completes the data processing, the image processing unit 150 notifies the JOB control software 605 of the completion of JOB[B] processing (step S641). The JOB control software 605 receives (step S641) the process completion of JOB[B], and notifies the application software 600 of the completion of JOB[B] (step S613). Then, the application software 600 responds to the external device that made the processing request with the completion of JOB[B] (step S604).

As described above, the JOB control software 605 generates a plurality of command lists (DPL) for a plurality of processing requests. Thus, in accordance with a contention state of hardware resources, the JOB control software 605 instructs data processing in order, whereby one hardware resource can be shared for a plurality of processing requests, and the manufacturing cost can be reduced.

Task Switching Operation for Multiple JOBs

In the basic operation of the plurality of JOBs described above, synchronization waiting is performed for synchronization with an external device during band processing. At this time, if there is a response 651 from the external device 650 in a short period of time as in the case of the synchronization wait 632, there will be no major problem. However, if there is no response 656 from the external device 655 for a non-negligible period of time, such as the synchronization wait 638, the processing completion 634 of JOB[A] during that period is also delayed. In other words, it is not likely that the JOB control software 605 can instruct the image processing unit 150 to perform data processing for JOB[B]. As a result, the processing of the processing request B is made to wait due to the processing delay of the unrelated processing request A, and the speed of the processing request B is lowered.

Therefore, in order to cope with such a problem, the image processing unit 150 according to the embodiment, upon receiving an instruction to process another job B from the JOB control software of the control CPU during execution of a certain job A, stores, in the JOB queue 272, information indicating that there has been a request (including the address of the command list) in order to add the job B to the queue. Then, when a timing for executing a preset command in the job A being executed has arrived, the image processing unit 150 determines whether or not an instruction for a job B which is not the job A being executed has already been accepted, and switches to the job B in accordance with confirming the presence of the job B.

Hereinafter, a concrete example of a method of switching the tasks of JOB[A] and JOB[B] and concealing the synchronization waiting time of JOB[A] will be described with reference to FIGS. 6A and 6B. Note that description regarding operation similar to the basic operation for a plurality of JOBs described above will be omitted.

After the second data processing JOB[A]<1> (step S633), the image processing unit 150 waits for synchronization (step S638) until the image processing unit 150 receives (step S656) the JOB[A]<1> response from the external synchronization <1> port of the device 655. The image processing unit 150 can store the presence or absence of a plurality of JOB data processing instructions in the synchronization register 262, and can determine that a JOB[B] data instruction 612 has been received prior to synchronization waiting (step S638) as illustrated in FIGS. 6A and 6B. The image processing unit 150 performs JOB[B] task switching (step S660), which will be described later, and switches the execution target from data processing for JOB[A] to data processing for JOB[B]. Then, the image processing unit 150 executes data processing JOB[B]<0> (step S640). The image processing unit 150 successively executes data processing JOB[B]<1> (step S641) and data processing JOB[B]<2> (step S642) because the JOB[A]<1> response has not been received. Because the image processing unit 150 receives the JOB[A]<1> response part way through the data processing JOB[B]<2> (step S642), the image processing unit 150 performs task switching (step S661) to the data processing of the JOB[A] which is described later. After receiving the JOB[A]<1> response, the image processing unit 150 finishes all the processing, and notifies the JOB control software 605 of the completion of the JOB[A] processing (step S634). The JOB control software 605 receives (step S634) the process completion of JOB[A], and notifies the application software 600 of the completion of JOB[A] (step S611). Then, the application software 600 responds, with the completion of JOB[A] (step S603), to the external device that made the processing request.

Meanwhile, the image processing unit 150 resumes the data processing of JOB[B] in the meantime. The image processing unit 150 switches tasks to the data processing of JOB[B] (step S662), and executes remaining data processing JOB[B]<3> (step S643). When the image processing unit 150 completes the data processing, the image processing unit 150 notifies the JOB control software 605 of the completion of JOB[B] processing (step S641). The JOB control software 605 receives (step S641) the process completion of JOB[B], and notifies the application software 600 of the completion of JOB[B] (step S613). Then, the application software 600 responds to the external device that made the processing request with the completion of JOB[B] (step S604).

Variation

In the above description, the task switching operation to another JOB is performed when synchronization with an external device is waited for due to a synchronization command. For example, with a branch command, because the DPL address, which is the reading destination for a command list (DPL) is reset, the command list (DPL) is re-read from the RAM 106. When the command list (DPL) is re-read, the image processing execution unit 203 stops until the command list (DPL) of the reset DPL address reaches the image processing unit 150 from the RAM 106. Therefore, the position of the branch command can be a delimiter (control point) of processing. As a variation of the present embodiment, as illustrated in FIG. 5, configuration may be taken to, by decoding a branch command, reset the DPL address and switch tasks (step S542). Then, while the data processing of the task of another JOB is being executed after the task switching, in parallel the command list (DPL) pointed to by the DPL address that was reset before the switching is read back to the intermediate buffer of the image processing unit 150. When the data processing is restarted, the stop time for re-reading the command list (DPL) is eliminated, and the data processing can be speeded up. As described above, since the synchronization command and the branch command are synchronization points of a series of data processing, they are referred to as synchronization control commands in the present invention. As a further variation of the present embodiment, a command for executing both synchronization and branch operations by one command may be provided to reduce the number of commands in the command list (DPL) and speed up data processing.

Effects of the Present Embodiment

As described above, by performing the task switching operation for a plurality of JOBs, it is possible to reduce the effect that a delay due to external synchronization has on other data processing unrelated to the external synchronization. As a result, the data processing apparatus can stably execute data processing for a plurality of JOBs. Further, since the data processing for another JOB can be executed so as to conceal time waiting for synchronization with an external unit, the processing time of the entire apparatus can be shortened when processing requests of a plurality of JOBs are in conflict with each other.

Second Embodiment

Dividing Operation of Data Processing in Accordance with Software for Task Switching By switching tasks as described above, the processing time for data processing of a plurality of JOBs can be shortened. However, if, hypothetically, JOB[A] has a higher priority order than JOB[B] and the data processing time of JOB[B] is longer than the synchronization waiting time of JOB[A], JOB[A] has to wait for the data processing of JOB[B]. In order to maintain real-time performance for JOB[A] which has synchronized with an external device, the processing apparatus of the present embodiment has a function of dividing data processing.

Figure 8A:
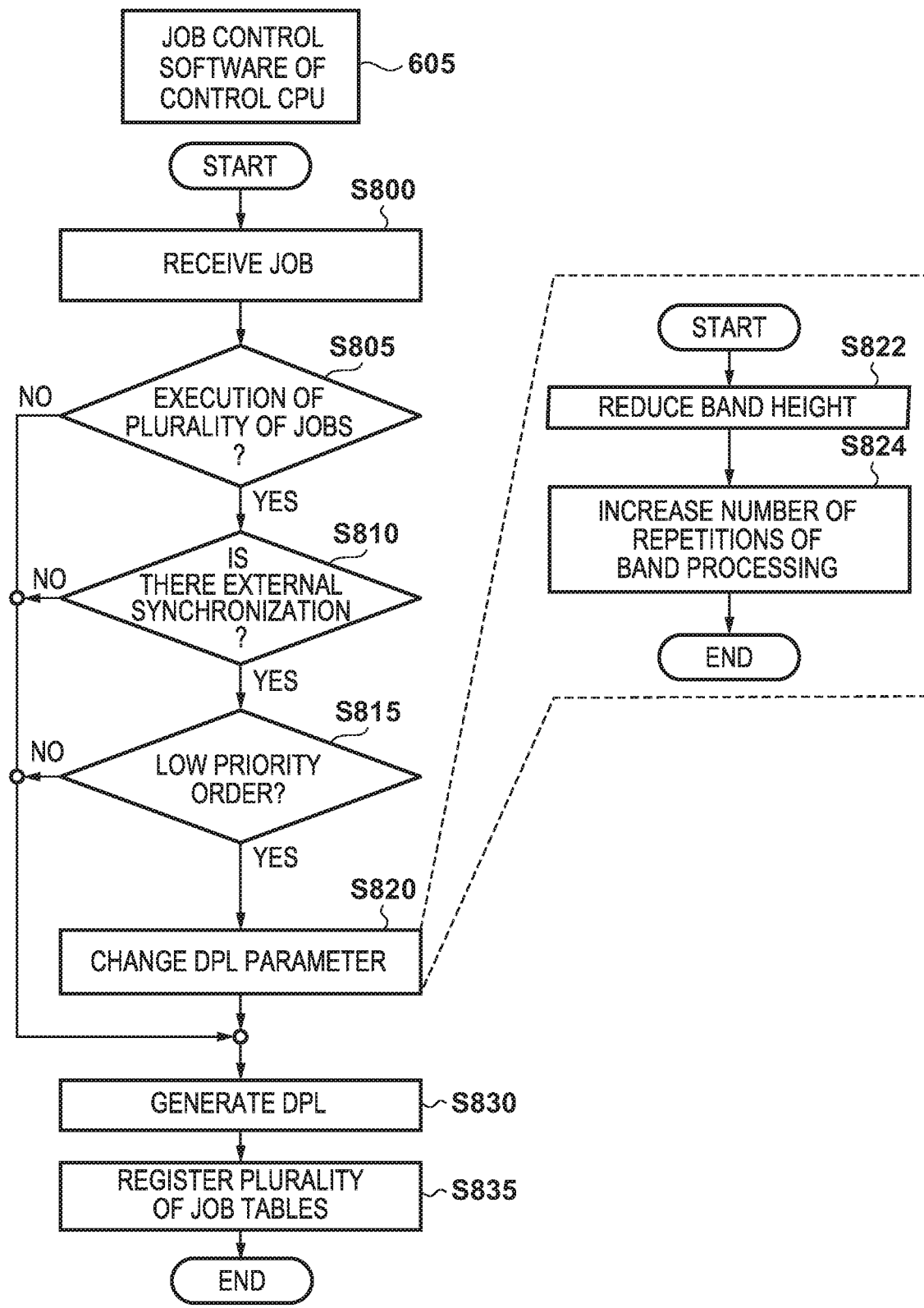
FIG. 8A illustrates a flow for generating a command list (display list).

Referring to FIG. 8A, a function of dividing the data processing of the job control software 605 will be described. In step S800, the JOB control software 605 advances the processing to step S805 when a JOB is received from the application software 600. In step S805, the JOB control software 605 determines whether or not there is a JOB that is already being executed.

If there is no job already being executed (No in step S805), the job control software 605 advances the processing to step S830 without performing division of data processing. Then, in step S830, the job control software 605 generates a command list (DPL) of the job received in step S800.

On the other hand, if there is a JOB that is already being executed (Yes in step S805), the JOB control software 605 further continues the determination. Specifically, the JOB control software 605 determines whether or not the executing JOB has external synchronization. When there is no external synchronization (No in step S810), the JOB control software 605 determines that the received JOB cannot be inserted during the executing JOB, and, in step S830, generates a command list (DPL) without performing division of the data processing. On the other hand, if there is external synchronization in the executing JOB (YES in step S810), the receiving JOB can be inserted. Therefore, the JOB control software 605 makes a further determination in step S815.

In this step S815, the JOB control software 605 determines whether or not the received JOB to be executed has lower priority order. If the received JOB does not have a lower priority order (NO in step S815), the processing needs to be completed as quickly as possible, and the command list (DPL) is generated without division of data processing being performed (step S830). In addition, it is preferable to give priority to the data processing of the executing JOB which has a higher priority order, and to perform the data processing for the received JOB of lower priority order only during the synchronization waiting of the executing JOB. Therefore, if the received JOB to be executed has a low priority order (Yes in step S815), the JOB control software 605 needs to divide the data processing of the received JOB in detail. In the data processing of the present embodiment, the content of the processing is controlled by the command list (DPL) example of FIG. 4. For example, the image processing command 420 of FIG. 4 is one execution of the band processing of FIG. 3, and the number of executions of this band processing can be controlled by the number of repetitions of the branch command 450. The data processing amount for one round of band processing can be controlled by setting the band height in the register setting command 412. Therefore, in order to finely divide the data processing of the received JOB, the JOB control software 605 may change the band height of one round of band processing to a small value (step S822) and proportionally increase the number of times band processing will be executed (step S824). For example, in a case of repeatedly performing data processing with a band height of 16 pixels each time for an A4-sized (6608 pixels in the sub-scanning direction) sheet surface, the image processing unit 150 performs band processing 413 times. Therefore, the job control software 605 reduces the band height value from 16 pixels to 4 pixels to reduce the band height (step S822), and proportionally increases the number of repetitions of the band processing from 413 times to 1652 times (step S824). The job control software 605 sets the band height of the register setting command 412 to a value of four lines, and generates a command list (DPL) by setting the number of repetitions of the branch command 450 to a value of 1650 times (step S830).

Finally, the JOB control software 605 registers (step S835) the received JOB in a consecutive JOB table, and, prior to receiving the completion reply of the executing JOB, instructs the image processing unit 150 for data processing of the received JOB (step S612).

For example, in an example of an application of the present embodiment, a delay of general-purpose image processing due to waiting for external synchronization with a scanner unit has been a problem. The performance of the scanner unit attached to the copying machine can be calculated in advance based on the product specification and statistics measured at a time of factory shipment, and a waiting time for external synchronization with the scanner unit is established. Therefore, the value of the band height after division of band regions in accordance with the synchronization waiting time can of course be calculated. The JOB control software 605 can adjust the data processing length in accordance with a data processing division operation which is in accordance with parameters determined for each product.

In the above example, the problem of waiting for external synchronization with the scanner unit has been described, but it is similar for waiting time for head driving of an inkjet printer. In addition, although the above example has been described with respect to the waiting time between bands, if the number of repetitions is set to a large value, application is also possible to ADF continuous scanning of a plurality of pages and continuous printing of a plurality of pages. For example, in the case of a copying machine that uses an electronic exposure device, a long synchronization wait occurs between successive page prints in order to stabilize or calibrate the exposure device. If the technique of the present invention is used, hardware resources can be allocated to other image processes even for such long synchronization waits between pages.

Effects of the Present Embodiment

As described above, by performing the operation of dividing data processing in accordance with software for task switching, data processing of a higher priority JOB that is being executed can be prioritized. By the dividing operation of the data processing, the data processing of a lower priority JOB is performed only during synchronization waiting of the higher priority JOB, and it is possible to suppress a reduction in speed of the higher priority JOB due to task switching. Thus, the data processing amount of the lower priority JOB can be adjusted to suit the higher priority JOB.

Third Embodiment

Dividing Operation of Data Processing in Accordance with Hardware for Task Switching In the second embodiment described above, the JOB control software 605 changes parameters when generating the command list (DPL) to realize the operation for dividing the data processing. However, expressing the same data processing content in accordance with the processing request in a dynamically different command list (DPL) depending on the state at the time of execution increases a test workload for software. Further, the JOB control software 605 not only must manage the instruction and completion of the JOB for each processing request, but must continue to monitor the state of concurrent execution of a plurality of JOBs. Therefore, the processing load of the software increases.

Figure 8B:
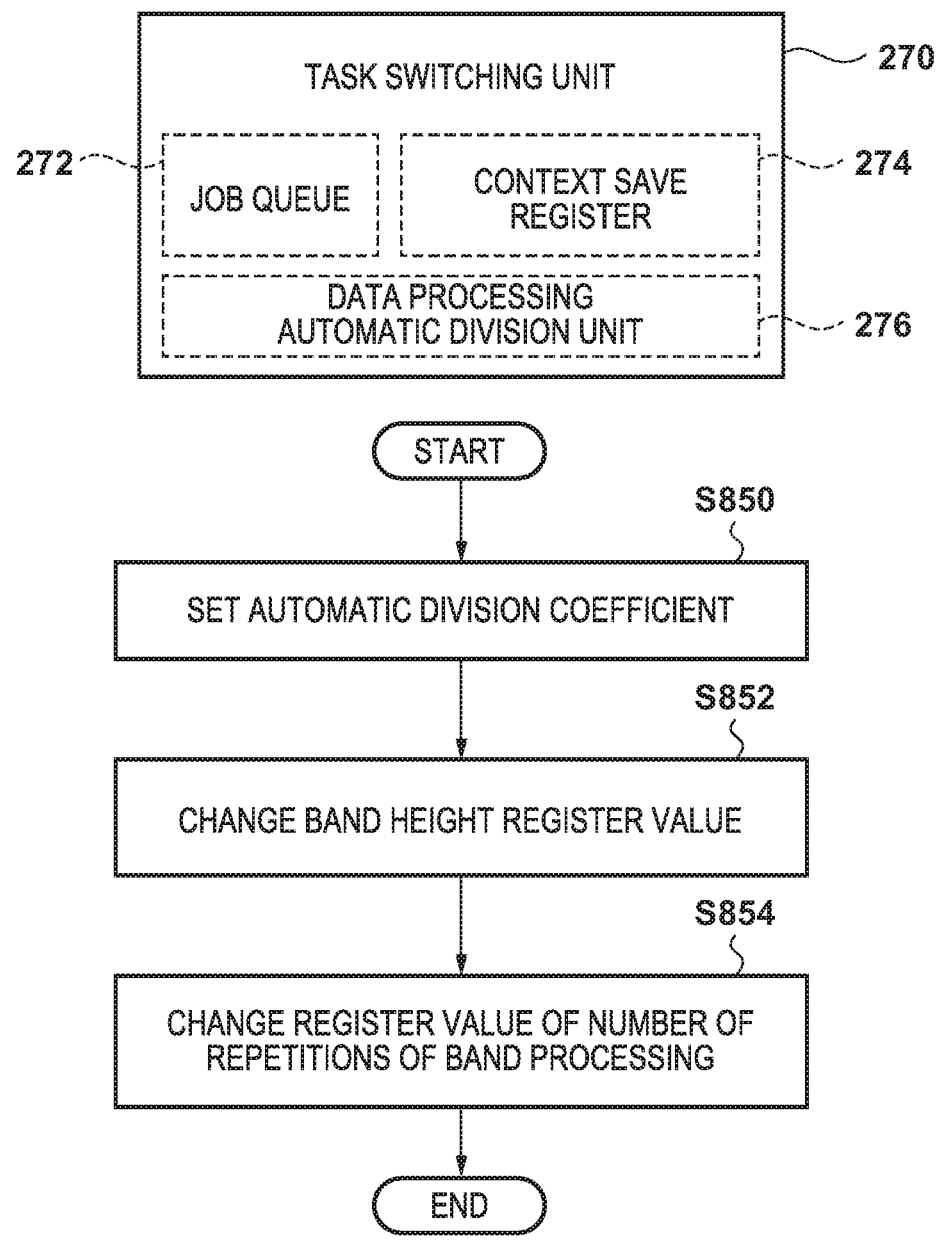
FIG. 8B is a diagram illustrating an example of changing a parameter for controlling a processing load in accordance with hardware.

In the third embodiment, the command list (DPL) generated by the JOB control software 605 is kept the same as that in the basic operation of a plurality of JOBs, and the hardware (image processing unit 150) realizes change of a DPL parameter. Hereinafter, referring to FIG. 2 and FIG. 8B, description will be given in detail.

The image processing unit 150 receives an instruction (step S612) for data processing of a certain JOB, and receives not only the readout address (DPL address) of the command list (DPL) of the JOB but also a priority and the presence/absence of external synchronization.

The task switching unit 270 of the image processing unit 150 is provided with a JOB queue 272 for managing a plurality of JOBs, and a save register 274 for a context parameter required at the time of return from task switching. The task switching unit 270 registers, in the JOB queue 272, the DPL address, the priority, and the presence or absence of external synchronization from the data processing instruction. Information of a plurality of JOBs can be registered in the JOB queue 272. The task switching unit 270 includes a data processing automatic division unit 276 and an automatic division coefficient register (not illustrated). For example, the job control software 605 sets a value for fine division in the automatic division coefficient register in advance (step S850). The task switching unit 270 sets "4" in the automatic division coefficient register when performing the same division of the data processing as that in the second embodiment which is described above. The task switching unit 270, accepting the synchronization wait for the data processing being executed, stores the address of the synchronization command 440 of the command list (DPL) of the data processing being executed or a pointer position of the internal buffer in the save register 274. Then, the task switching unit 270 fetches information of the JOB to be executed next from the JOB queue 272, reads out the command list (DPL) of this JOB, and starts data processing. When the task switching unit 270, by decoding processing of the command list (DPL), performs processing of the register setting command 412 for setting the band height, the task switching unit 270 divides the value of the band height by the value of the automatic division coefficient register to obtain the band height (step S852). When the task switching unit 270 performs processing for the branch command 450 indicating the number of repetitions, the task switching unit 270 multiplies the number of repetitions by the value of the automatic division coefficient register to obtain the number of repetitions (step S854).

As described above, by changing the parameters that affect the processing granularity of the data processing, the task switching unit 270 finely divides the data processing that is being executed, and the image processing unit 150 executes data processing in small pieces. Before long, in accordance with reception of external synchronization for the task before switching, the synchronization wait for the task before switching completes. When the synchronization command 440 of the command list (DPL) of the data processing being executed is decoded, the DPL address or the pointer position of the internal buffer is stored in the save register 274. Then, the pointer position of the internal buffer or the DPL address of the task before switching is read out from the save register 274, and the data processing of the task before switching is resumed.

Furthermore, the task switching unit 270 may control the processing granularity of the data processing by using external synchronization and priority which are job information. For example, configuration may be taken to reduce the value of the fine division in accordance with the level of the priority order indicated by the priority, with the value of the automatic division coefficient register being set to "2" instead of "4" for data processing having the higher priority order, and the value of the automatic division coefficient register being set to "8" instead of "4" for data processing having the lower priority order. In addition, whether or not to perform the task switching function may be switched depending on whether or not the task being executed has external synchronization.

Effects of the Present Embodiment

As described above, by performing operation to divide data processing in accordance with the hardware for the task switching, it is possible to suppress a speed reduction of a high priority job due to the task switching without increasing a software control load.

Fourth Embodiment

Configuration Example Using IoT Sensor Array

FIG. 1B illustrates a configuration of a data processing apparatus provided with a plurality of sensors. As an IoT device, there are inputs from an array of many sensors of a wide variety of different types. The data processing unit 150 performs data processing on inputs from these multiple sensors. Each of the sensors of the sensor array 180 stores data acquired via the input ports 182 in a predetermined storage region of the DRAM 106 in real time. The sensor array 180 and the data processing unit 150 are coupled to each other by an external synchronization port 184, and can synchronize with each other by notifying each other of the completion of processing. In the configuration of the present embodiment, a plurality of external synchronization ports 184 of a plurality of sensors are connected to one data processing unit 150, and one data processing unit 150 (hardware resource) is shared by the plurality of sensors. Therefore, the configuration of the present embodiment does not include individual data processing units for the plurality of sensors, and this can be said to be a configuration capable of supporting a large number of sensors with low cost and low power consumption. However, the input data of the sensors must be subject to data processing in real time in synchronization with each of the plurality of sensors.

In the example of task switching described above, the operation in which one of a plurality of jobs does not wait for synchronization with an external device has been described. In the fourth embodiment, an operation of waiting for synchronization with a plurality of external devices by a plurality of jobs and an operation of task switching will be described with reference to FIGS. 7 and 9.

Example of Expansion of Image Processing Unit

Figure 9:
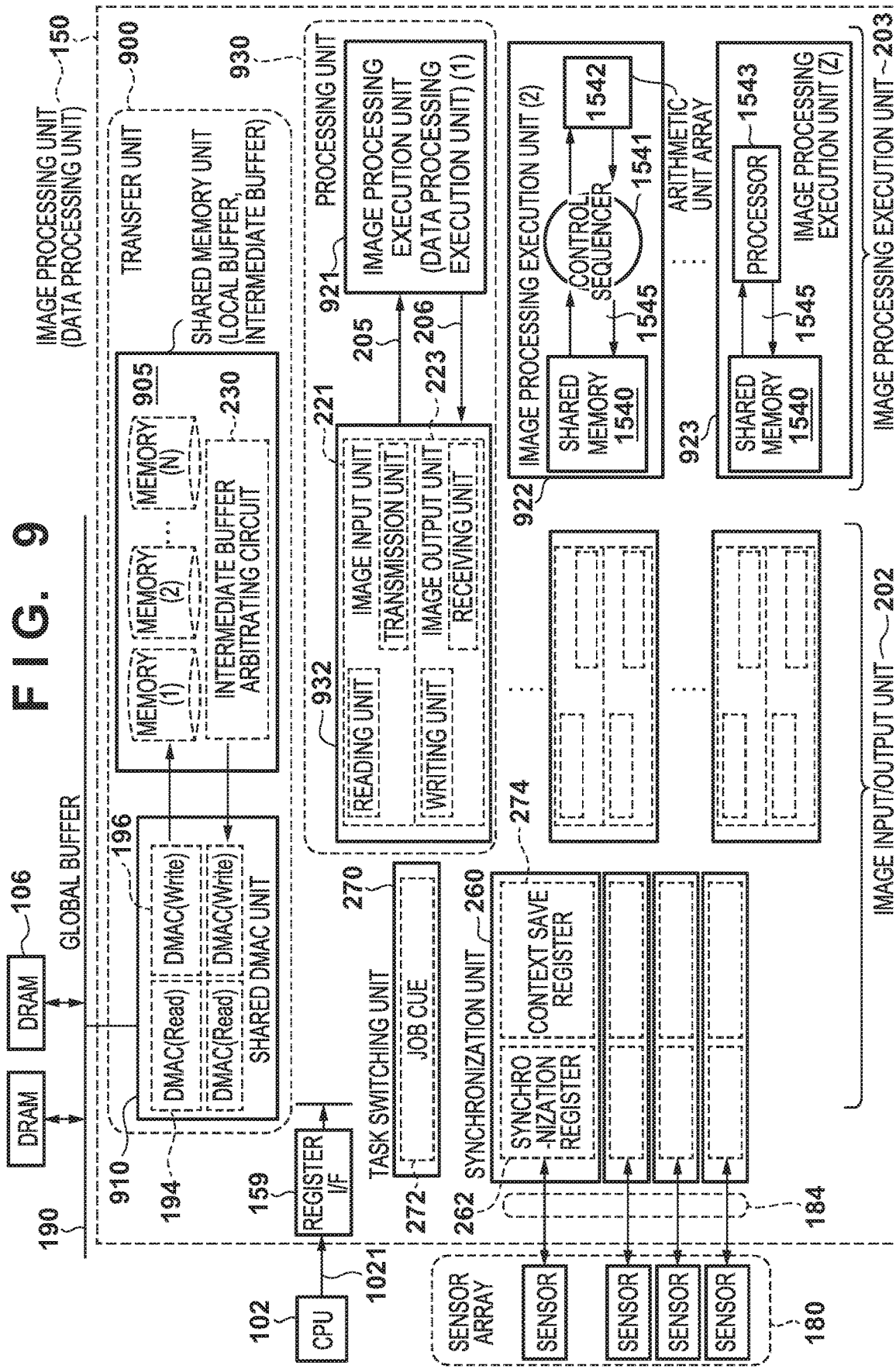
FIG. 9 is a block diagram illustrating an example of a configuration of an image processing unit having a large number of external synchronizations.

In the fourth embodiment, in order to flexibly cope with synchronization with a large number of external devices and task switching for a large number of jobs, the image processing unit 150 is expanded as illustrated in FIG. 9. More specifically, the number of synchronization units 260 is increased according to the number of sensors in the sensor array, and the synchronization register 262 is adjusted to a number of external synchronizations that are necessary. The context save register 274 that was provided in the task switching unit 270 in the configuration described above is provided in the synchronization unit 260 in the present embodiment, and the configuration is changed so that the number of tasks that can be switched can be increased and managed in accordance with the synchronization destination. In addition, the configuration is such that the number of image processing execution units 203 that execute data processing is increased and parallelized, so that concurrent processing for data processing of a plurality of jobs is possible.

For example, an image processing execution unit 921 is a circuit of the image processing execution unit 203 of FIG. 2 described in the first embodiment. In other modes of implementing an image processing execution unit (922 and 923), the image processing execution unit may be connected, by a coprocessor I/F 1545, to the image input/output unit 202 via the shared memory 1540. The image input/output unit writes a plurality of input pixel values to the shared memory 1540 to validate input data. In response to the reception of the input data, the image processing execution unit 203 activates a control sequencer 1541, controls an arithmetic unit array 1542 to perform data processing, and writes output data back to the shared memory 1540. The control sequencer 1541 validates the output data and notifies the image input/output unit 202 of the completion of the data processing. At this time, the control sequencer 1541 and the arithmetic unit array 1542 may be the processor 1543 itself.

Something similar can be realized even if the coprocessor I/F 1545 via the shared memory 1540 is an input FIFO and an output FIFO. Note that, because the image processing execution unit 203 handles a role of performing data processing on image data included in the image processing apparatus, there is no problem even if it is referred to as a data processing execution unit.

As described above, the image processing execution unit 203 may have a heterogeneous (asymmetric) configuration that is optimal in cost for various types of data processing for a plurality of jobs, and may include a large number of image processing execution units (1) 921, execution units (2) 922 to execution units (Z) 923, separate from the number of synchronization units 260.

Further, in the present embodiment, the data processing of one job is switched, in accordance with task switching, to the data processing of another job while waiting for the synchronization. Then, when the data processing of the next job is resumed in accordance with task switching, it is not necessarily allocated to the image processing execution unit that was performing data processing before task switching. Therefore, it is desirable to manage a context save register 274 in association with each job. In one example of the present embodiment, since it is assumed that there is one job for each sensor as illustrated in FIG. 9, configuration is such that context save registers 274 are provided in the synchronization unit 260. For example, it is desirable that the image processing unit 150 can flexibly change the number of the context save registers 274 in accordance with an increase or decrease of the number of jobs. Therefore, it could be said to be more effective to have a configuration that separately provides, for example, a context saving buffer (SRAM) or the like in the image input/output unit 202 and stacks contexts in accordance with the number of jobs.

In the first embodiment, as illustrated in FIG. 2, the intermediate buffer control unit 222 is shared between the image input unit 221 and the image output unit 223. However, in the present embodiment, the image processing execution unit to which the data processing of a certain JOB is allocated is dynamically switched. Therefore, in the present embodiment, it is more efficient to share the DMAC 194, DMAC 196 and the intermediate buffer control unit 222 with respect to the plurality of image processing execution units 203 and the plurality of image input units 221 and image output units 223 linked to the plurality of image processing execution units 203. Therefore, in the present embodiment, configuration is such that the image processing unit 150 includes a shared DMAC unit 910 and a shared memory unit 905 as a transfer unit 900, and the transfer unit 900 is shared by the plurality of image input units 221, the plurality of image output units 223, and the plurality of image processing execution units 203.

Each unit includes a plurality of circuits therein. For example, in the example of FIG. 9, the shared DMAC unit 910 is provided with two of each of the above-described DMAC (Read) 194 and DMAC (Write) 196. The shared memory unit 905 is configured by a plurality of storage means such as memories (1) to (N). Each memory is generally realized by one or a plurality of SRAM or the like, and is generally referred to as a local buffer.

Similarly, the image input/output unit 202 includes a plurality of image input/output units (1) to (Z), and the image processing execution unit 203 similarly includes a plurality of image processing execution units (1) to (Z).

The shared DMAC unit 910 and the shared memory unit 905 are connected to each other, and the pair of shared DMAC units 910 and the shared memory unit 905 are collectively referred to as an image processing transfer unit 900.

Like the image input/output unit 932 and the image processing execution unit 921, one image input/output unit and one image processing execution unit are connected in a pair, and are collectively referred to as an image processing processing unit 930. Further, since the image processing execution unit may be used for a purpose other than image processing that handles image data, the image processing execution unit may be simply referred to as a data processing execution unit.

As described above, the image processing unit 150 includes a plurality of image processing units (a pair of an image input/output unit and an image processing execution unit) as described by (1) to (Z). One image processing transfer unit (a pair of a shared DMAC unit and a shared memory unit) is mounted with respect to the plurality of processing units, and the transfer unit is shared by the processing units (1) to (Z). The processing units (1) to (Z) and the transfer unit are connected through a reading unit, a writing unit, a transmission unit, and a receiving unit of each processing unit.

Switching Operation for Plurality of Tasks with External Synchronization

Figure 7A:
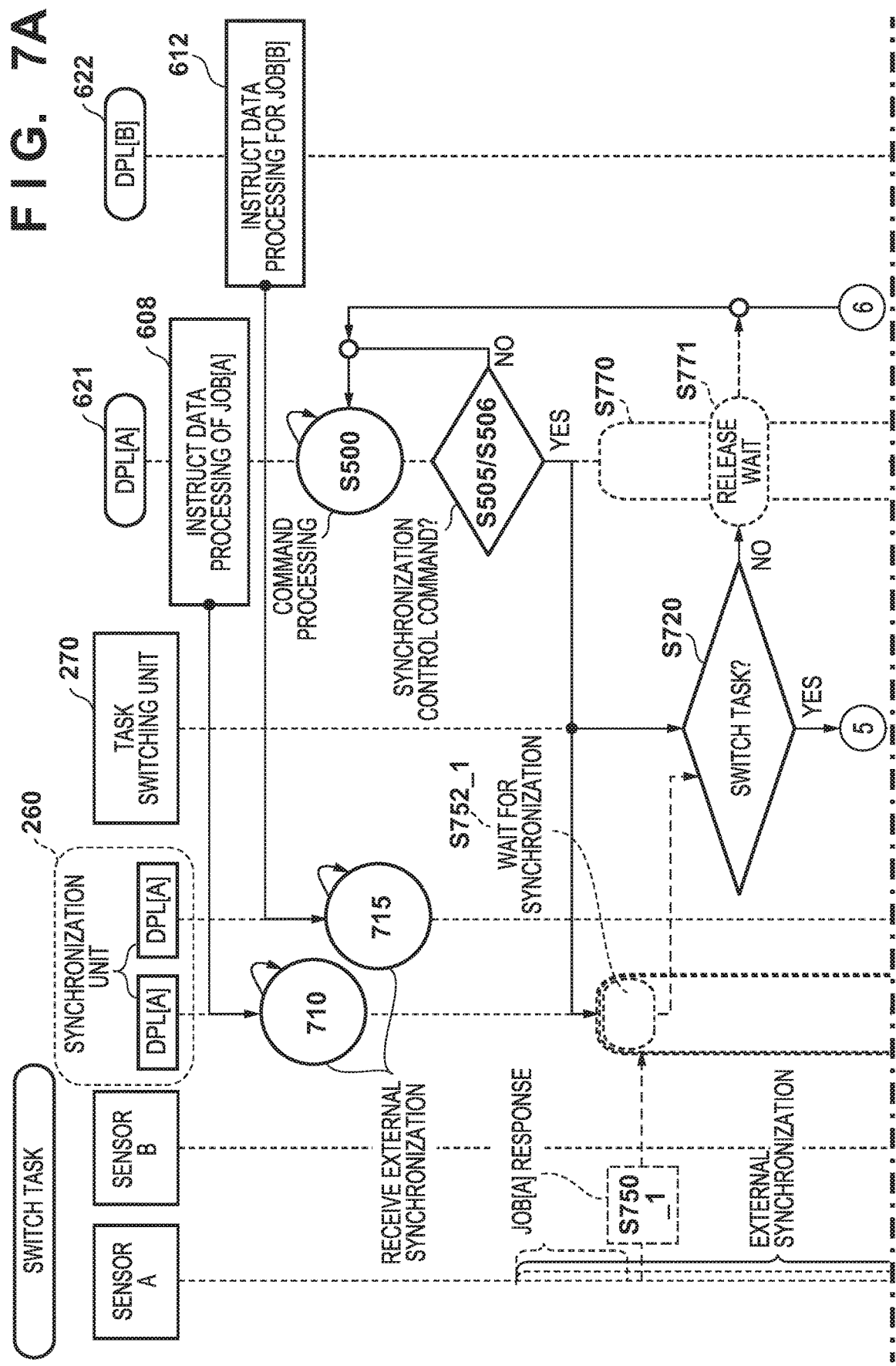
Figure 7B:
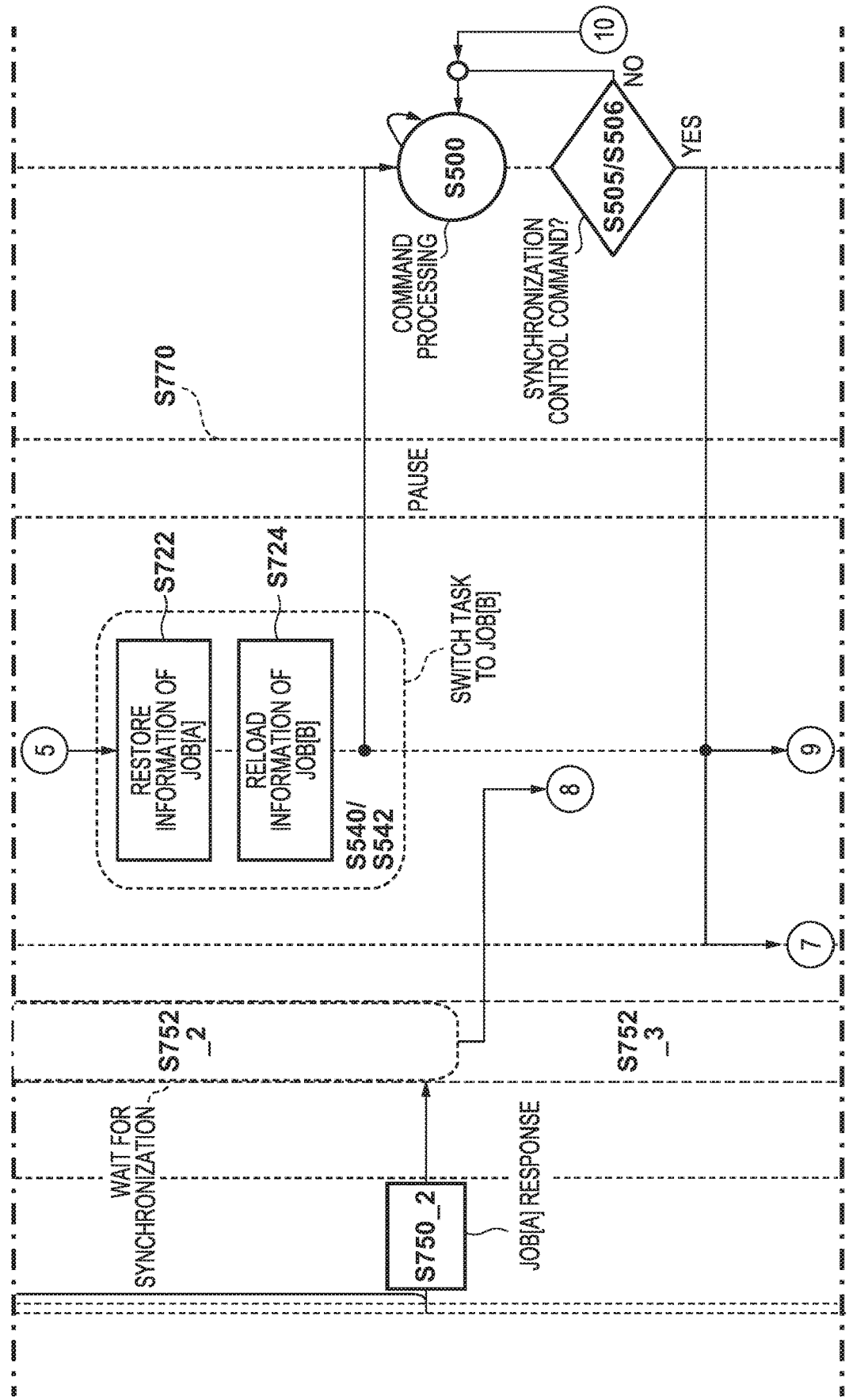

The synchronization with a large number of external devices and the task switching operation for a large number of jobs according to the present embodiment will be described with reference to FIGS. 7A-7C. Note that, for a case similar to as in an embodiment described above, description will be omitted. To simplify the explanation, FIGS. 7A-7C explains switching between two instances of external synchronization and two instances of JOB data processing. FIGS. 7A-7C are examples in which two DPL, DPL[A] 621 and DPL[B] 622, corresponding to two processing requests (for sensors A and B) are subjected to data processing by one image processing unit 930 in accordance with task switching. Receiving data processing instructions 608 and 612, reception 710 and 715 of external synchronization for two synchronization units 260 are activated.

Firstly, the image processing unit 150 performs the data processing of the DPL[A] 621 for which the data processing has been instructed earlier, and the determination (step S505/S506) of the synchronization control command is executed in the command processing (step S500). If the command is a synchronization control command (YES in step S505/S506), there is a wait for synchronization and it is determined whether to switch tasks (step S720). For example, sensor A has a higher priority order than sensor B. Then, when the response (step S750_1) from the sensor A immediately returns and the synchronization wait (step S752_1) is short, the task switching is not performed (NO in step S720), the wait for the data processing of the DPL[A] 621 is released (step S771), and the data processing of the DPL[A] 621 is continued.

On the other hand, when the sensor A has a lower priority order than the sensor B, the response (step S750_1) from the sensor A immediately returns, and even if the synchronization wait (step S752_1) is short, the task is switched (Yes in step S720). When the response (step S750_2) from the sensor A does not return immediately and the synchronization wait (step S752_2) is long, task switching is performed as a matter of course (Yes in step S720).

The task switching unit 270 temporarily stores information of DPL[A] (such as DPL program counters and the DPL address) in a context save register 274 of the synchronization unit which is described above (step S722). In the present embodiment, the saving of the DPL information is referred to as a restore. Then, the task switching unit 270 starts data processing for DPL[B]. If the data processing is resumed, the task switching unit 270 reads out the information of DPL[B] temporarily stored in the context save register 274 of the synchronization unit, and resumes the data processing of DPL[B]. In the present embodiment, reloading of the DPL information is referred to as reloading.

Then, the image processing unit 150 determines whether there is a synchronization control command in the command processing of DPL[B], and when there is a synchronization control command, the image processing unit 150 waits for synchronization (step S762), and waits for a response (step S760) from the sensor B.

If there is already a response from the sensor A (step S750_2), the task switching unit 270 performs task switching to the DPL[A] data processing (Yes in step S730). If there is a response (step S760) from the sensor B before a response (step S750_3) from the sensor A, the task switching unit 270 does not switch the task to the DPL[A] data processing (NO in step S730). Then, the task switching unit 270 cancels (step S776) the wait for the data processing of DPL[B], and continues the processing.

When the task is switched to the data processing of the DPL[A] (YES in step S730), the task switching unit 270 restores (step S732) the information of the DPL[B]. Then, the task switching unit 270 reloads the DPL[A], releases (step S772) the wait for the data processing of the DPL[A], and restarts the data processing.

Variation

In the above description, task switching is determined based on the length of the synchronization wait and the priority order of a job. If the processing time required for each sensor constituting the sensor array is known in advance, time slots may be finely sliced for each unit period of time and the data processing for each sensor may be allocated in a time period without performing the determination of the dynamic task switching as described above.

Effects of the Present Embodiment

As described above, in the present embodiment, it is possible to realize a heterogeneous (asymmetric) circuit configuration optimal in cost for various types of data processing and task switching for a plurality of JOBs. As a result, synchronization with a large number of external devices and task switching of a large number of jobs can be flexibly handled, and hardware resources can be optimally utilized.

<Points of Attention of Present Embodiment>

As described above, one command list (display list) being generated for one processing request may be given as a feature common to the first to fourth embodiments. As an effect thereof, the application software and the control software may generate a command list in response to a processing request, instruct data processing, and wait for the processing to complete. Therefore, the application software and the control software can very easily manage the state of necessary processing. Since it has a function of executing image processing/data processing a plurality of times with one command list, a wide variety of image processing can be realized in one command list. In the function of the present invention, a synchronization control command as a control point can be set at an arbitrary command position during a plurality of times of image processing/data processing to divide the image processing/data processing. In the function of the present invention, a plurality of command lists corresponding to a plurality of processing requests are acquired, and the allocation of a hardware resource can be changed from one command list to another command list with this control point as a synchronization point. As a result, in the function of the present invention, it is possible to freely switch a part of the data processing (a task) of a plurality of processing requests. In other words, the synchronization control command of the present invention is not only a control point of an operation of a series of data processing of a certain process, but also has a meaning of a synchronization point (branch point) for switching to data processing of another processing request.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-238647, filed Dec. 20, 2018, which is hereby incorporated by reference herein in its entirety.

What is claimed is:

1. A data processing apparatus operable to execute processing requested by an application, the apparatus comprising:

a CPU (central processing unit);

a memory storing a program to be executed by the CPU; and a processing circuit that, upon receiving a first instruction for processing, executes the processing in accordance with a command list indicated by the first instruction;

wherein the program causes the CPU to function as a control unit configured to, upon receiving a request for processing from the application, generate a command list corresponding to the request, set a control point in the command list, and instruct the processing circuit to perform the processing, wherein the processing circuit comprises
a switching unit configured to, if a second instruction is received from the control unit during execution of the command list for the first instruction, switch to execution of a command list for the second instruction at a timing of execution of a command that is the control point in the command list for the first instruction and after the second instruction is received and synchronization with an external device starts, to conceal synchronization waiting time.

2. The apparatus according to claim 1, wherein the command that is the control point is a synchronization command for synchronizing with an external device.

3. The apparatus according to claim 1, wherein the command that is the control point is a branch command for branching to a position of a command to be executed.

4. The apparatus according to claim 1, wherein the processing circuit performs processing in units of partial images obtained by dividing an image into a plurality of partial images, and
wherein the control unit controls a size of the units of partial images to be processed when switching a command list to be executed.

5. The apparatus according to claim 4, wherein the partial images are band regions obtained by dividing an image to be processed into horizontal or vertical directions, and
wherein the control unit controls the height of the band regions to adjust the amount of data to be processed.

6. The apparatus according to claim 4, wherein the control unit controls a size of the partial images according to a priority order of a command list.

7. The apparatus according to claim 4, wherein the control unit controls a size of the partial images according to a length of synchronization with the external device.

8. The apparatus according to claim 4, wherein the control unit controls a size of the partial images by changing a parameter at a time of generation of a command list of a switching destination.

9. The apparatus according to claim 4, wherein the processing circuit controls a size of the partial images by calculating a value of a parameter of a command list of a switching destination.

10. The apparatus according to claim 1, wherein parameters of a command list include a band height and the number of repetitions of band processing.

11. The apparatus according to claim 1, wherein the processing circuit includes a plurality of synchronization units, and saves information of a plurality of command lists acquired in response to processing requests.

12. The apparatus according to claim 11, wherein each of the plurality of synchronization units is connected to a sensor.

13. The apparatus according to claim 1, wherein the processing circuit has a plurality of data processing units, and
wherein the switching unit allocates one of a plurality of command lists corresponding to a plurality of processing requests to one of the plurality of data processing units.

14. The apparatus according to claim 13, wherein each of the plurality of data processing units has a heterogeneous configuration that uses a circuit differing from other circuits of the plurality of data processing units.

15. A control method of a data processing apparatus operable to execute processing requested by an application, the method comprising:

a processing step of, if there is a first instruction for processing, executing the processing in accordance with a command list indicated by the first instruction; and
a control unit step of, upon receiving a request for processing from the application, generating a command list corresponding to the request, setting a control point in the command list, and instructing the processing step to perform the processing,
wherein the processing step comprises
a switching step of, if a second instruction is received from the control unit during execution of the command list for the first instruction, switching to execution of a command list for the second instruction at a timing of execution of a command that is the control point in the command list for the first instruction and after the second instruction is received and synchronization with an external device starts, to conceal synchronization waiting time.

16. The method according to claim 15, wherein the command that is the control point is a synchronization command for synchronizing with an external device.

17. The method according to claim 15, wherein the command that is the control point is a branch command for branching to a position of a command to be executed.

18. The method according to claim 15, wherein the processing step performs processing in units of partial images obtained by dividing an image into a plurality of partial images, and
wherein the control step controls a size of the units of partial images to be processed when switching a command list to be executed.

19. The method according to claim 18, wherein the partial images are band regions obtained by dividing an image to be processed into horizontal or vertical directions, and
wherein the control step controls the height of the band regions to adjust the amount of data to be processed.

20. A non-transitory computer-readable storage medium storing a program which, when read and executed by a computer, causes the computer to execute steps of a control method of a data processing apparatus operable to execute processing requested by an application, the method comprising:

a processing step of, if there is a first instruction for processing, executing the processing in accordance with a command list indicated by the first instruction; and
a control unit step of, upon receiving a request for processing from the application, generating a command list corresponding to the request, setting a control point in the command list, and instructing the processing step to perform the processing,
wherein the processing step comprises
a switching step of, if a second instruction is received from the control unit during execution of the command list for the first instruction, switching to execution of a command list for the second instruction at a timing of execution of a command that is the control point in the command list for the first instruction and after the second instruction is received and synchronization with an external device starts, to conceal synchronization waiting time.

* * * * *